(12) United States Patent
Peng et al.

(10) Patent No.: US 12,346,873 B2
(45) Date of Patent: Jul. 1, 2025

(54) REACH AND FREQUENCY PREDICTION FOR DIGITAL COMPONENT TRANSMISSIONS

(71) Applicant: Google LLC, Mountain View, CA (US)

(72) Inventors: Jiayu Peng, Sunnyvale, CA (US); Chenwei Wang, Mountain View, CA (US); Matthew Tran Clegg, Los Angeles, CA (US); Meng-Hao Li, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 17/845,778

(22) Filed: Jun. 21, 2022

(65) Prior Publication Data

US 2023/0410034 A1 Dec. 21, 2023

(51) Int. Cl.
*G06Q 10/087* (2023.01)
*G06N 7/01* (2023.01)

(52) U.S. Cl.
CPC ............. *G06Q 10/087* (2013.01); *G06N 7/01* (2023.01)

(58) Field of Classification Search
CPC ............................... G06Q 10/087; G06N 7/01
See application file for complete search history.

(56) References Cited

U.S. PATENT DOCUMENTS

2018/0096417 A1* 4/2018 Cook .................. G06N 5/01
2021/0192280 A1* 6/2021 Zhang ................. G06N 20/20

OTHER PUBLICATIONS

Danaher et al., "Modeling Multivariate Distributions Using Copulas: Applications in Marketing" Marketing Science 30(1), Nov. 2010, 4-21 (Year: 2010).*
Danaher et al., "Modeling Multivariate Distributions Using Copulas: Applications in Marketing" Marketing Science 30(1), Nov. 2010, 4-21.
Danaher, "Modeling page views across multiple websites with an application to internet reach and frequency prediction." Marketing Science 26.3, May 2007, 422-437.
Goerg, "Estimating reach curves from one data point." Nov. 21, 2014, 7 pages.
Lewandowski et al., "Generating random correlation matrices based on vines and extended onion method." Journal of multivariate analysis 100.9, Oct. 2009, 1989-2001.

(Continued)

*Primary Examiner* — Azam A Ansari
(74) *Attorney, Agent, or Firm* — Fish & Richardson P.C.

(57) ABSTRACT

In one aspect, there is provided a method that includes: obtaining multiple input frequency histograms that each correspond to a respective transmission commitment, where a transmission commitment corresponds to a subset of publishers from a set of publishers; generating a frequency model based on the input frequency histograms, where the frequency model is a parametric model parameterized by a set of model parameters that include a correlation matrix with a respective correlation value for each pair of publishers from the set of publishers; receiving a request to predict a frequency histogram for a target transmission commitment corresponding to a target subset of publishers; generating a predicted frequency histogram for the target transmission commitment using the frequency model; and generating one or more predictions characterizing the target transmission commitment using the predicted frequency histogram.

20 Claims, 12 Drawing Sheets

(56) References Cited

OTHER PUBLICATIONS

Pourahmadi et al., "Distribution of random correlation matrices: Hyperspherical parameterization of the Cholesky factor." Statistics & Probability Letters 106, Nov. 2015, 5-12.
Skvortsov et al., "Virtual people: Actionable reach modeling." Jun. 21, 2019, 20 pages.
Github.com [online], "Planning Evaluation Framework" Apr. 2021, retrieved on Mar. 17, 2025, retrieved from URL <https://github.com/world-federation-of-advertisers/planning-evaluation-framework>, 7 pages.

* cited by examiner

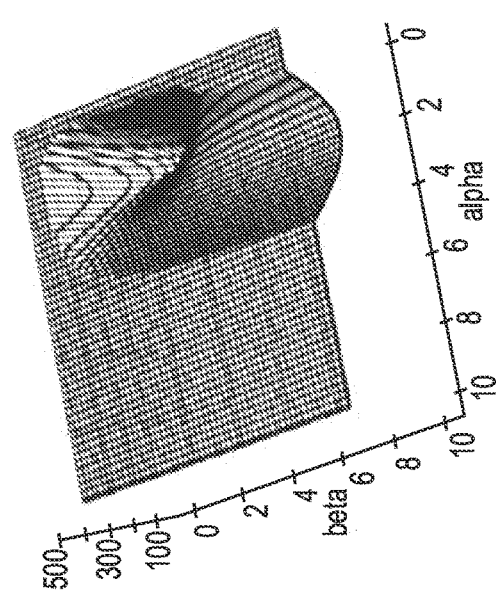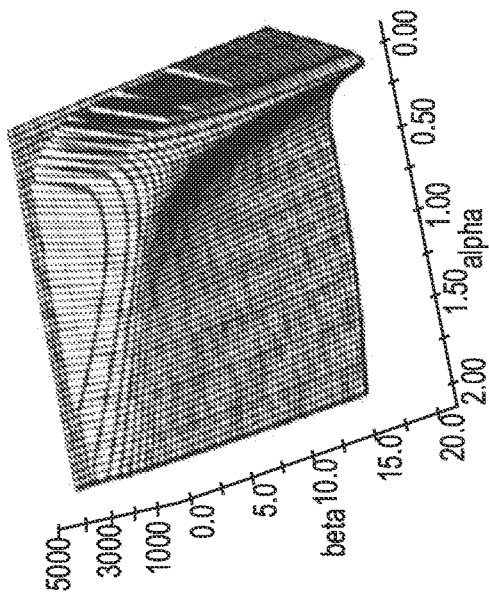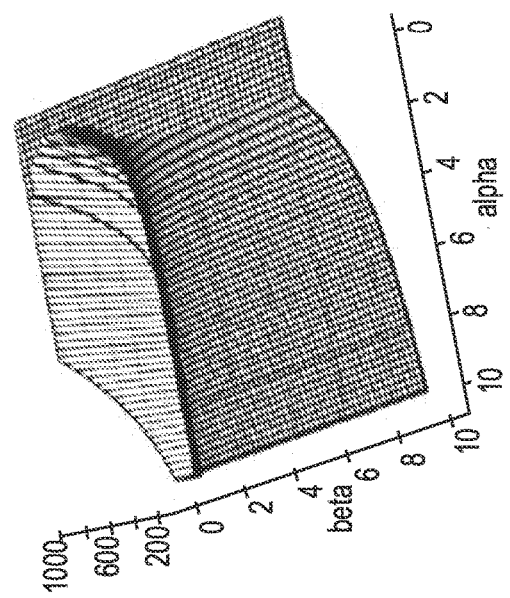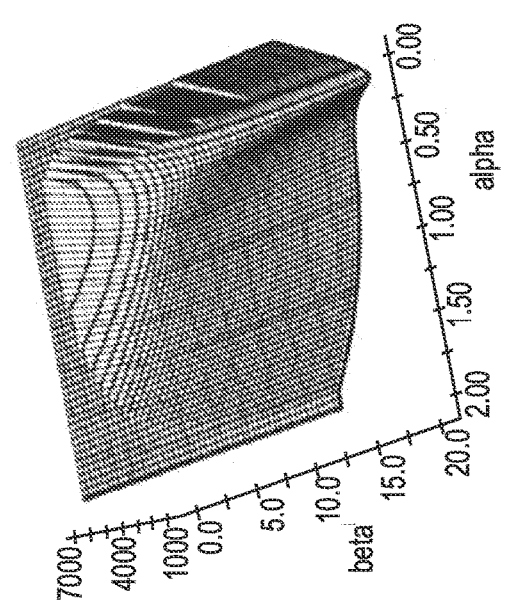
FIG. 5

REACH AND FREQUENCY PREDICTION FOR DIGITAL COMPONENT TRANSMISSIONS

BACKGROUND

This specification relates to predicting reach and frequency of digital component transmissions to user devices.

Digital components are discrete units of digital content or digital information, which can be incorporated into various electronic documents or applications. Digital components can be provided by a publisher and transmitted for presentation with various electronic documents or applications at user devices. A transmission commitment can specify a total number of times the digital component is transmitted by means of a publisher.

SUMMARY

This specification describes a reach and frequency planning system implemented as computer programs on one or more computers in one or more locations that generates one or more predictions characterizing a transmission commitment in relation to digital components. For a particular transmission commitment, the reach and frequency planning system can predict, for example, the total number of users who will receive at least one transmission of the digital component, and/or the number of users who will receive a transmission of the digital component a specified number of times.

A transmission commitment can be associated with a reach and a frequency of transmission of the digital component. Reach refers to a number of distinct users who received at least one transmission of the digital component under the transmission commitment. Reach can be an important metric for evaluating the efficacy of a particular transmission commitment. The frequency can represent a number or fraction of users that received the transmission of the digital component a particular number of times. The frequency can help to determine if users are being underexposed or overexposed to the digital component. Often, it may be desirable to determine a trade-off between the reach and the frequency of the digital component, e.g., to prevent under or over exposure, while ensuring adequate reach. Accordingly, there exists a growing need for systems and methods that can effectively estimate the reach and the frequency resulting from different transmission commitments of digital components.

According to a first aspect there is provided a method performed by one or more computers, the method including: obtaining multiple input frequency histograms that each correspond to a respective transmission commitment. A transmission commitment corresponds to a subset of publishers from a set of publishers and specifies, for each publisher in the subset publishers, a number of transmissions of a digital component by way of the publisher, and a frequency histogram corresponding to the transmission commitment defines, for each of multiple frequency values, a respective number of users who received a number of transmissions of the digital component given by the frequency value when the digital component is transmitted in accordance with the transmission commitment.

The method further includes generating a frequency model based on multiple input frequency histograms. The frequency model is a parametric model parameterized by a set of model parameters. The model parameters include a correlation matrix that includes a respective correlation value for each pair of publishers from the set of publishers. The frequency model is configured to process an input defining an input transmission commitment to generate an output that defines a predicted frequency histogram corresponding to the input transmission commitment. Generating the frequency model includes training the set of model parameters of the frequency model, using a numerical optimization technique, to optimize an objective function that depends on the input frequency histograms.

The method further includes receiving a request to predict a frequency histogram for a target transmission commitment corresponding to a target subset of publishers, and in response to receiving the request: generating a predicted frequency histogram for the target transmission commitment using the frequency model, and generating one or more predictions characterizing the target transmission commitment using the predicted frequency histogram.

In some implementations, processing the input defining the input transmission commitment to generate the output that defines the predicted frequency histogram corresponding to the input transmission commitment includes: sampling multiple random vectors using: (i) a Gaussian copula distribution parameterized by the correlation matrix, and (ii) the input transmission commitment, and generating the predicted frequency histogram using the random vectors.

In some implementations, sampling a random vector using: (i) the Gaussian copula distribution parameterized by the correlation matrix, and (ii) the input transmission commitment, includes: generating a sample vector from the Gaussian copula distribution parameterized by the correlation matrix, where the sample vector includes a respective dimension corresponding to each publisher, generating a transformed sample vector by transforming each dimension of the sample vector using a frequency histogram for a corresponding publisher, and generating each dimension of the random vector based on a corresponding dimension of the transformed sample vector.

In some implementations, generating the transformed sample vector by transforming each dimension of the sample vector using the frequency histogram for the corresponding publisher includes, for each dimension of the sample vector:, transforming the dimension of the sample vector using a cumulative distribution function of a one-dimensional Gaussian distribution and a cumulative distribution function of the frequency histogram for the corresponding publisher.

In some implementations, generating each dimension of the random vector based on the corresponding dimension of the transformed sample vector includes: sampling the dimension of the random vector from a binomial distribution parameterized by: (i) a size parameter given by corresponding dimension of the transformed sample vector, and (ii) a probability parameter based on a number of transmissions specified by the input transmission commitment for the corresponding publisher.

In some implementations, generating the predicted frequency histogram using the random vectors includes: processing the random vectors to generate a set of scores that includes a respective score for each random vector and generating the predicted frequency histogram by applying a bin-counting operation to the set of scores.

In some implementations, the score for each random vector is defined as a sum of components of the random vector.

In some implementations, obtaining multiple input frequency histograms includes: obtaining, for each publisher in the set of publishers, a respective observed frequency histogram corresponding to an observed number of transmissions of the digital component by way of the publisher, and generating, for each publisher and based on the observed frequency histogram for the publisher, a respective inventory-level frequency histogram for the publisher that corresponds to an inventory-level number of transmissions of the digital component by way of the publisher, where the input frequency histograms include the respective inventory-level frequency histogram for each publisher.

In some implementations, for one or more of the input frequency histograms, the objective function measures an error between: (i) a predicted frequency histogram generated by processing data defining the transmission commitment corresponding to the input frequency histogram using the frequency model, and (ii) the input frequency histogram.

In some implementations, the error comprises one or more of an $L_1$ error, an $L_2$ error, or a cross-entropy error.

In some implementations, training the set of model parameters of the frequency model includes sequentially training each correlation value in the correlation matrix.

In some implementations, generating one or more predictions characterizing the target transmission commitment using the predicted frequency histogram includes: generating a prediction for a number of users that will receive a specified number of transmissions of the digital component under the target transmission commitment.

In some implementations, generating one or more predictions characterizing the target transmission commitment using the predicted frequency histogram includes: generating a prediction for a total number of users that will receive at least one transmission of the digital component under the target transmission commitment.

According to a second aspect, there is provided a system including: one or more computers, and one or more storage devices communicatively coupled to the one or more computers, where the one or more storage devices store instructions that, when executed by the one or more computers, cause the one or more computers to perform the operations of the method of any preceding aspect.

According to a third aspect, there are provided one or more non-transitory computer storage media storing instructions that when executed by one or more computers cause the one or more computers to perform the operations of the method of any preceding aspect.

Particular embodiments of the subject matter described in this specification can be implemented so as to realize one or more of the following advantages.

The systems and methods described in this specification can estimate the reach and the frequency of a hypothetical transmission commitment of a digital component using a frequency model. The frequency model parameters can be trained based on one or more observed transmission commitments of the digital component. Because the frequency model is trained based on observed (e.g., known, or measured) transmission commitments of the digital component, the frequency model is able to generate more accurate predictions characterizing hypothetical transmission commitments, when compared to other available systems.

Furthermore, after training, the frequency model can be used to generate predictions characterizing any hypothetical transmission commitment of the digital component, without the need to measure, or observe, its effect directly. Accordingly, the system and methods described in this specification can significantly reduce the amount of resources (e.g., computational resources) required to characterize a transmission commitment of the digital component, enabling effective reach and frequency planning. The resources saved by making predictions, instead of implementing each transmission commitment, can be allocated to other tasks, thereby reducing overall use of processing resources, which leads to higher efficiency.

The systems and methods described in this specification can make predictions characterizing not only a transmission commitment corresponding to a single publisher, but also a transmission commitment corresponding to a subset of publishers from a set of publishers. In such cases, the frequency model parameters can be trained based on multiple observed transmission commitments of the digital component, each transmission commitment corresponding to a subset of publishers. After training, the frequency model can be used to characterize a hypothetical transmission commitment corresponding to any subset of publishers in the set of publishers, e.g., a subset of publishers that was not used to train the frequency model parameters. In other words, the systems and methods described in this specification can make predictions characterizing hypothetical transmission commitments that may otherwise only be possible to characterize by making measurements, or observations, directly. Therefore, the systems and methods described in this specification enable effective planning and allocation of resources for multiple publishers, thereby reducing the overall use of processing resources and maximizing the overall efficiency of the hypothetical transmission commitment when it is implemented.

Moreover, the predictions characterizing the transmission commitment generated by the systems and methods described in this specification can enable more efficient use of resources. For example, it may be desirable for a digital content provider to achieve a target reach and/or a target frequency of transmission of a digital component. In such cases, the digital content provider can use the systems and methods described in this specification to determine the number of times the digital component should be transmitted in order to achieve the target, therefore reducing the likelihood of unnecessarily exceeding the target and facilitating a more efficient use of resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates example surfaces of an objective function for single-publisher reach and frequency planning.

Like reference numbers and designations in the various drawings indicate like elements.

DETAILED DESCRIPTION

Figure 1:
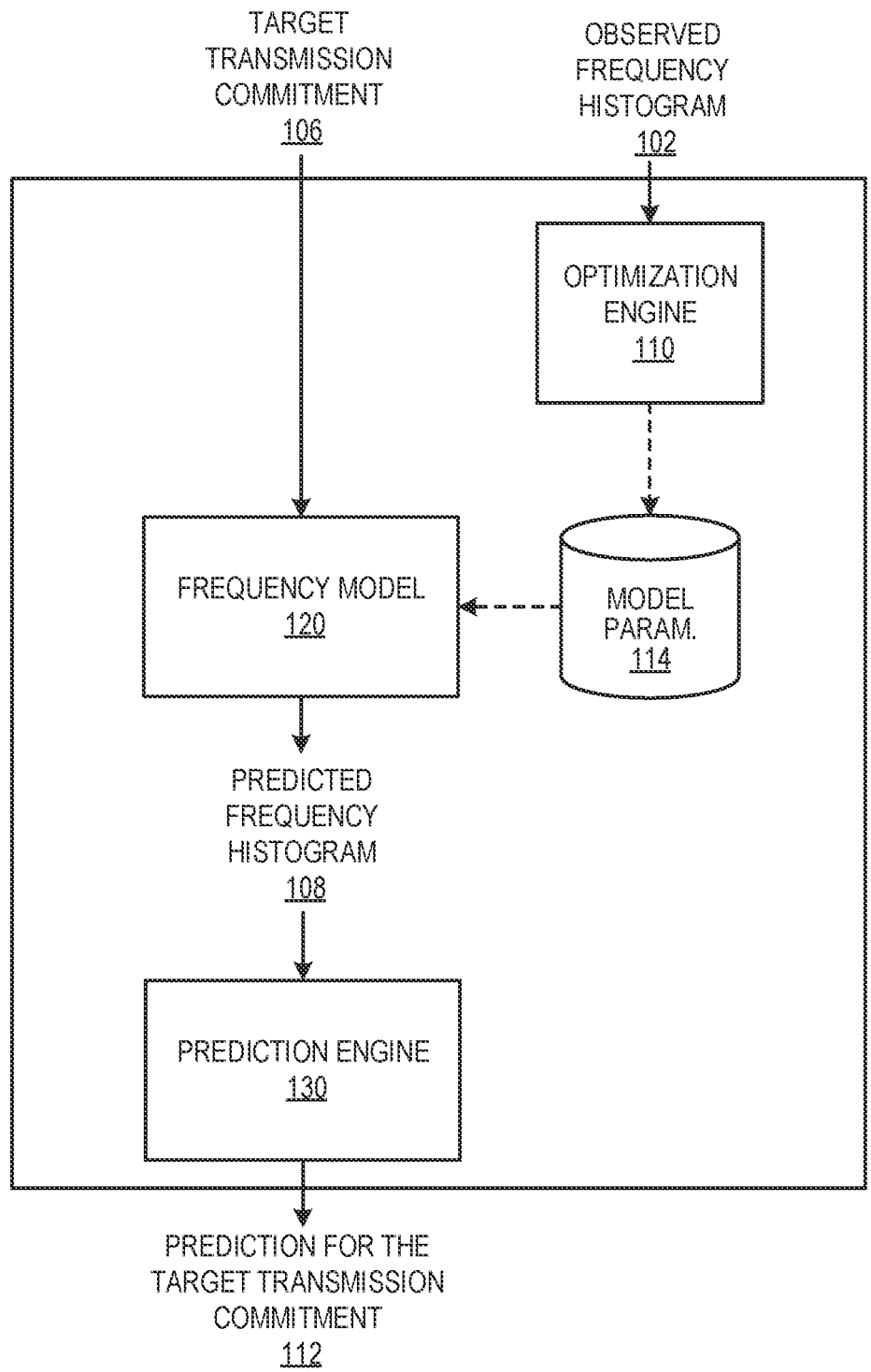
FIG. 1 is a block diagram of an example reach and frequency planning system.

This specification describes a reach and frequency planning system that can generate one or more predictions characterizing a transmission commitment of a digital component.

As used throughout this document, the phrase "digital components" refers to discrete units of digital content or digital information that can include one or more of, e.g., video clips, audio clips, multimedia clips, images, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. Generally, a digital component is defined by (or provided by) a single source (e.g., a digital component provider), but a digital component provided from one source could be enhanced with data from another source (e.g., weather information, real time event information, or other information obtained from another source).

A digital component distribution system (e.g., as described below with reference to FIG. 11) can transmit digital components for presentation with electronic documents to user devices through a publisher (e.g., a website or application). For example, if the publisher is a website, transmitting the digital component can include displaying the digital component on the web site at user devices. The digital component distribution system can transmit a digital component in accordance with a transmission commitment that specifies a number of transmissions of the digital component, e.g., a number of times that the digital component should be transmitted for presentation with electronic documents at user devices. Generally, a transmission commitment of a digital component can specify any appropriate number of transmissions of the digital component, e.g., 1, 10, 1 thousand, 100 thousand, 1 million, 50 million, 100 million, or any other appropriate number of transmissions of the digital component. In some cases, the transmission commitment of a digital component can specify a number of transmissions of the digital component by way of a single publisher. In other cases, a transmission commitment of a digital component can correspond to multiple publishers, e.g., the transmission commitment can specify, for each of multiple publishers, a number of transmissions of a digital component by way of the publisher.

A transmission commitment of a digital component can be associated with a frequency histogram. As used throughout this document, a "frequency histogram" can define, for each of multiple frequency values, a respective number of users who each receive a number of transmissions of the digital component given by the frequency value when the digital component is transmitted a number of times specified by the transmission commitment. In other words, the frequency histogram can represent the reach and the frequency of the transmission commitment of a digital component. An example frequency histogram is described in more detail below with reference to FIG. 2.

For a particular transmission commitment, the reach and frequency planning system can predict a frequency histogram associated with that transmission commitment. Based on the predicted frequency histogram, the reach and frequency planning system can predict, for example, a number of users that will receive a specified number of transmissions of the digital component under the transmission commitment. In another example, the reach and frequency planning system can predict a total number of users that will receive at least one transmission of the digital component under the transmission commitment. These features and other features are described in more detail below.

The reach and frequency planning system is described in more detail below with reference to FIG. 1. In general, the system can be configured to implement single-publisher reach and frequency planning and/or multi-publisher reach and frequency planning. An example process for single-publisher reach and frequency planning that can be performed by the system is described in more detail below with reference to FIG. 4. An example process for single- and multi-publisher reach and frequency planning that can be performed by the system is described in more detail below with reference to FIG. 8. Lastly, an example process for multi-publisher reach and frequency planning that can be performed by the system is described in more detail below with reference to FIG. 9.

FIG. 1 is a block diagram of an example reach and frequency planning system 100. The reach and frequency planning system 100 is an example of a system implemented as computer programs on one or more computers in one or more locations in which the systems, components, and techniques described below are implemented.

The system 100 is configured to receive data defining a target transmission commitment 106 of a digital component corresponding to a single publisher, or multiple publishers, and generate one or more predictions 112 for the target transmission commitment 106. That is, the system 100 can process data defining the target transmission commitment 106 that specifies a number of transmissions of the digital component, and generate one or more predictions 112 characterizing the target transmission commitment 106. The system 100 can obtain the target transmission commitment in any appropriate manner. For example, the system 100 can receive data defining the target transmission commitment 106 from a user of the system 100, e.g., through an API made available by the system 100. Generally, the target transmission commitment 106 can define any appropriate number of transmissions of the digital component.

The system 100 can generate the predictions 112 for the target transmission commitment 106 by using: (i) an optimization engine 110, (ii) a frequency model 120, and (iii) a prediction engine 130, each of which is described in more detail next.

The optimization engine 110 can be configured to receive data characterizing one or more observed frequency histograms 102 that each correspond to a respective observed transmission commitment, and process the observed frequency histograms 102 to generate a frequency model 120 by training a set of frequency model parameters 114. The system 100 can use the frequency model 120 to generate predictions 112 characterizing the target transmission commitment 106.

As used throughout this document, an "observed transmission commitment," or an "input transmission commitment," refers to a transmission commitment of a digital component having a known (e.g., observed) frequency histogram associated with it. In general, the observed transmission commitment associated with the observed frequency histogram 102 can be different from the target transmission commitment 106, e.g., the number of transmissions of the digital component specified by the target transmission commitment 106 can be different from the number of transmissions of the digital component specified by the observed transmission commitment.

The system 100 can obtain one or more observed frequency histograms 102 in any appropriate manner. In some implementations, the system 100 can measure one or more observed frequency histograms 102 directly. For example, the system 100 can transmit a digital component a number of times through a publisher, or multiple publishers (e.g., in accordance with the observed transmission commitment), and measure a respective number of users who each received the transmission of the digital component. In another example, instead of measuring one or more observed frequency histograms 102 directly, the one or more observed frequency histograms 102 can be provided as an input to the system 100 by a user of the system 100.

Generally, the frequency model 120 can be configured to process an input defining an input transmission commitment that corresponds to a single publisher, or multiple publishers (e.g., the target transmission commitment 106), to generate an output that defines a predicted frequency histogram 108 corresponding to the input transmission commitment. In other words, for a given number of transmissions of the digital component corresponding to a single publisher, or multiple publishers, the frequency model 120 can be configured to predict, for each of multiple frequency values, a respective number of users who will each receive a number of transmissions of the digital component given by the frequency value.

Figure 2:
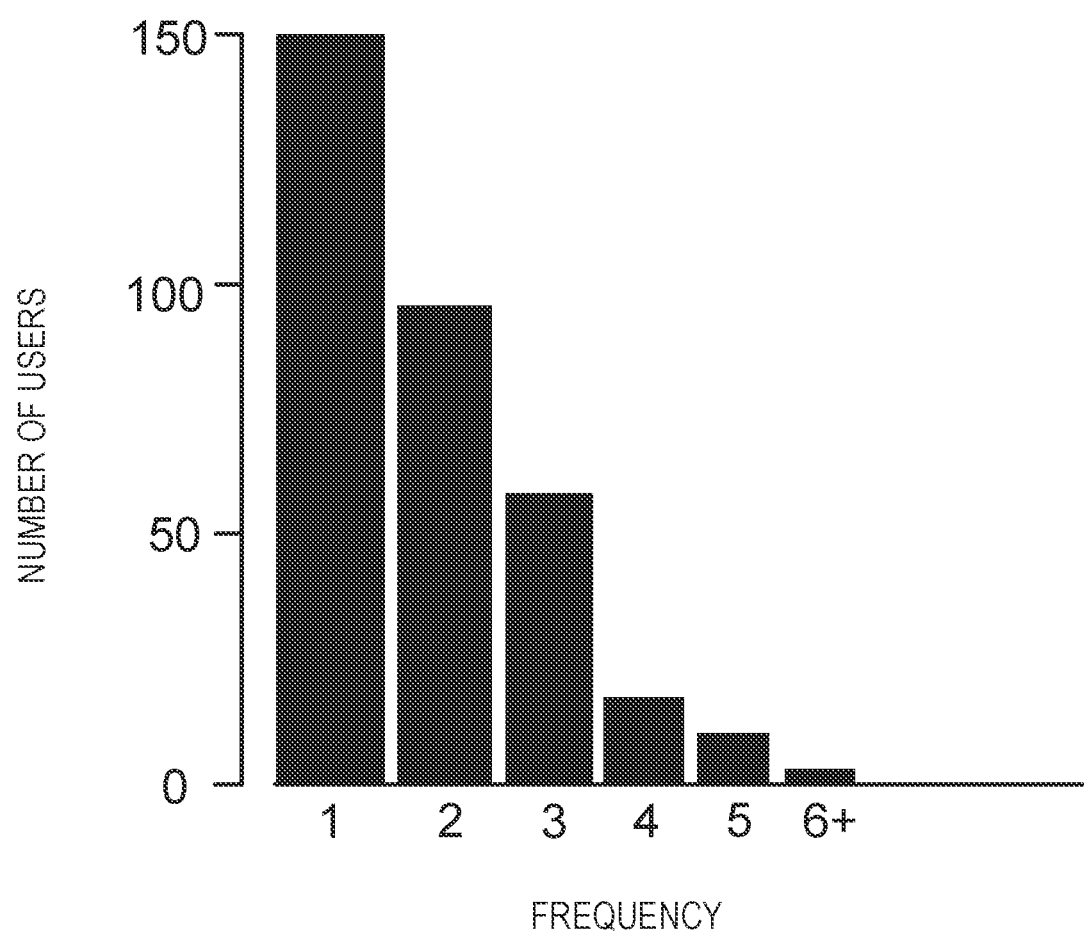
FIG. 2 illustrates an example of a predicted frequency histogram that can be generated by the reach and frequency planning system.

As illustrated in FIG. 2, the predicted frequency histogram 108 can specify multiple frequency values, and the number of users who will each receive a number of transmissions of the digital component given by each frequency value. In some implementations, the highest frequency value in the predicted frequency histogram 108 can specify the number of users who will receive a transmission of the digital component at least that number of times.

The system 100 can provide the predicted frequency histogram 108, generated by the frequency model 120 for the target transmission commitment 106 corresponding to a single publisher, or multiple publishers, to the prediction engine 130. The prediction engine 130 can use the predicted frequency histogram 108 to generate one or more predictions 112 for the target transmission commitment 112. For example, the prediction engine 130 can generate a prediction for a number of users that will receive a specified number of transmissions of the digital component under the target transmission commitment 106. In another example, the prediction engine 130 can generate a prediction for a total number of users that will receive at least one transmission of the digital component under the target transmission commitment 106. The predictions generated by the engine 130 based on the predicted frequency histogram 108 are described in more detail below with reference to FIG. 2 and FIG. 3.

In this manner, the system 100 can use the frequency model 120, generated based on one or more observed frequency histograms 102, each associated with respective observed transmission commitment, to make predictions 112 characterizing the target transmission commitment 106. In some implementations, the system 100 can take an action based on the predictions 112 generated by the prediction engine 130. For example, the system 100 can provide the predictions 112 for output to a user of the system 100 through the API made available by the system 100.

The frequency model 120 can be a parametric model parameterized by a set of model parameters 114. The optimization engine 110 can generate the frequency model 120 based on one or more observed frequency histograms 102 by training the set of frequency model parameters 114. For example, the optimization engine 110 can train the set of frequency model parameters 114, using a numerical optimization technique, to optimize an objective function that depends on the observed frequency histogram 102. The numerical optimization technique can be any appropriate numerical optimization technique. As a particular example, the technique can be a Nelder-Mead numerical optimization technique.

For each of one or more observed frequency histograms 102, the objective function can measure an error between: (i) the predicted frequency histogram 108 generated by processing data defining the observed transmission commitment corresponding to the predicted frequency histogram 108 using the frequency model 120, and (ii) the observed frequency histogram 102 associated with the observed transmission commitment.

After training the frequency model parameters 114 based on one or more observed frequency histograms 102, the system 100 can use the frequency model 120 to generate predictions 112 characterizing the target transmission commitment 106 corresponding to a single publisher, or multiple publishers, e.g., as described above.

FIG. 2 illustrates an example predicted frequency histogram 200 (e.g., the predicted frequency histogram 108 in FIG. 1) that can be generated by the reach and frequency planning system 100 described above with reference to FIG. 1.

Generally, the frequency histogram 200 can have the form $[R_1, \ldots, R_f]$, where $R_i$ defines a number of users who will receive a number of transmissions of the digital component given by the frequency value i when the digital component is transmitted according to a transmission commitment. Because the transmission commitment can correspond to a single publisher, or multiple publishers, the predicted frequency histogram 200 can also correspond to a transmission of the digital component by means of a single publisher, or multiple publishers, respectively.

Based on the predicted frequency histogram 200, the system 100 can predict the number of users that will receive a specified number of transmissions of the digital component. As a particular example, as illustrated in FIG. 2, when a digital component is transmitted according to a transmission commitment that specifies a particular number of transmissions by means of a publisher, 150 users will receive 1 transmission of the digital component through the publisher, and 2 users will receive 6 or more transmissions of the digital component through the publisher.

As described above with reference to FIG. 1, the system 100 can predict a reach associated with the transmission commitment of the digital component, e.g., a total number of users that will receive at least one transmission of the digital component under the transmission commitment. In order to predict the reach, the system 100 can, for example, sum $R_1 + \ldots R_f$ defined by the predicted frequency histogram 200.

Figure 3:
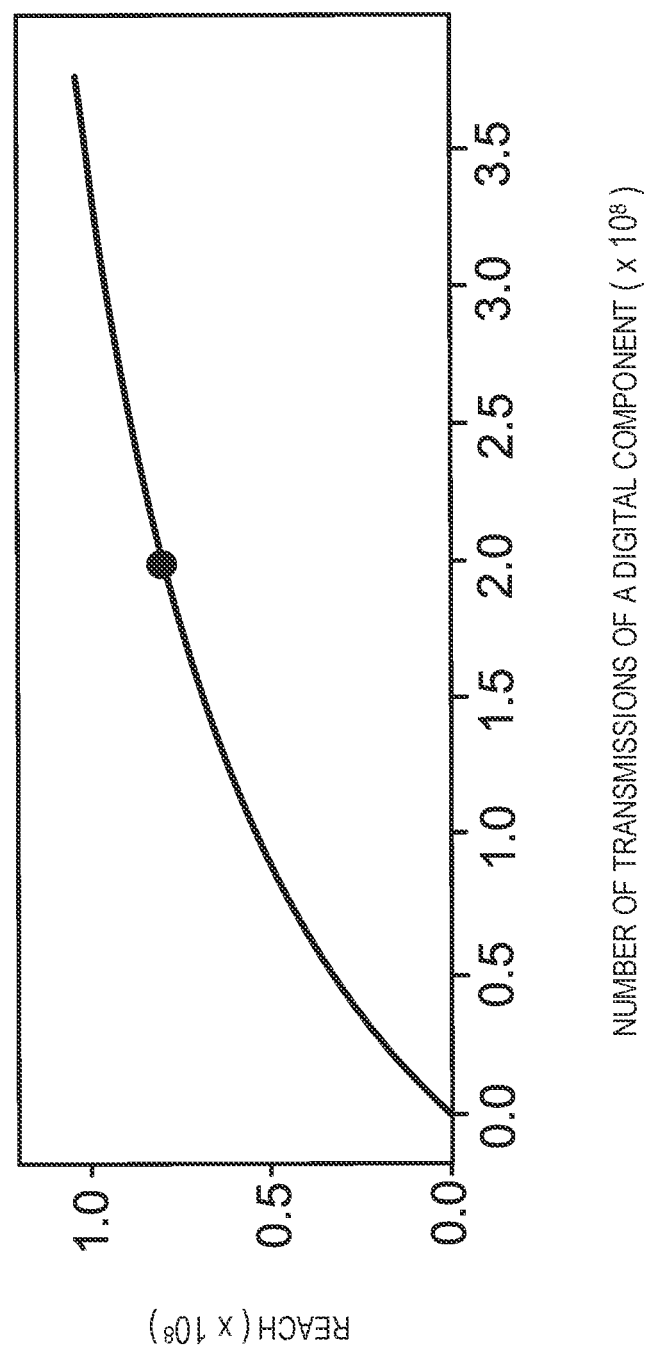
FIG. 3 illustrates example reach values predicted by the reach and frequency planning system.

FIG. 3 illustrates example reach values predicted by the reach and frequency planning system 100 described above with reference to FIG. 1. As illustrated in FIG. 3, for a transmission commitment corresponding to a single publisher that specifies $2 \times 10^8$ transmissions of a digital component, the system can predict a reach value corresponding to $8 \times 10^7$ number of users.

An example process for single-publisher reach and frequency planning that can be performed by the system 100 is described in more detail next with reference to FIG. 4.

Figure 4:
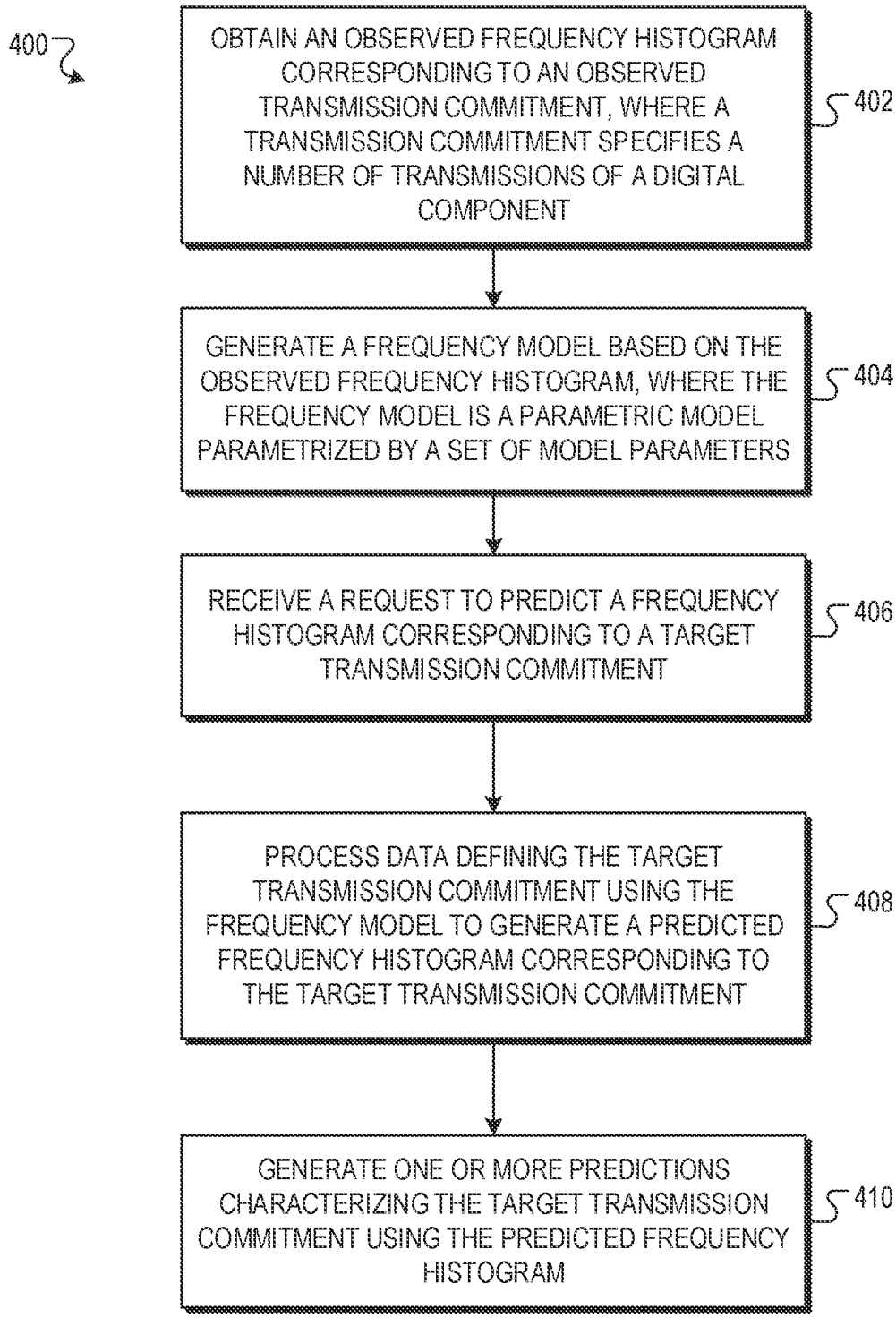
FIG. 4 is a flow diagram of an example process for single-publisher reach and frequency planning.

FIG. 4 is a flow diagram of an example process 400 for single-publisher reach and frequency planning. For convenience, the process 400 is described as being performed by a system of one or more computers located in one or more locations. For example, a reach and frequency planning system, e.g., the system 100 of FIG. 1, appropriately programmed in accordance with this specification, can perform the process 400.

The system obtains an observed frequency histogram corresponding to an observed transmission commitment (402). As described above with reference to FIG. 1, a transmission commitment can specify a number of transmissions of a digital component. A frequency histogram (e.g., illustrated in FIG. 2) corresponding to the transmission commitment can define, for each of multiple frequency values, a respective number of users who each receive a number of transmissions of the digital component given by the frequency value when the digital component is transmitted the number of times specified by the transmission commitment.

The system generates a frequency model based on the observed frequency histogram (404). As described above with reference to FIG. 1, the frequency model can be configured to process an input defining an input transmission commitment to generate an output that defines a predicted frequency histogram corresponding to the input transmission commitment.

As a particular example, for an input transmission commitment specifying $N_{inp}$ transmissions of the digital component by means of a publisher, the frequency model can generate the predicted frequency histogram that, for each of one or more frequencies i, defines a predicted number of users $R_i$ corresponding to frequency i as:

$$R_i = N_{pop} \sum_{i \leq j \leq m} \binom{j}{i} \left(\frac{N_{inp}}{N_{inv}}\right)^i \left(1 - \frac{N_{inp}}{N_{inv}}\right)^{j-i} \cdot f(j \mid \theta) \quad (1)$$

where $N_{pop}$ defines a total number of users who can receive a transmission of the digital component, m defines a total number of frequency values, j indexes frequency values between i and m, $N_{inv}$ is a model parameter of the frequency model defining an inventory-level number of transmissions of the digital component, $f(j|\theta)$ is the parametric probability distribution over the plurality of frequency values evaluated at frequency j, and $\theta$ are model parameters of the frequency model that parameterize the probability distribution $f(\cdot|\theta)$. The inventory-level number of transmissions of the digital component ($N_{inv}$) can be any appropriate number of transmissions of the digital component that is larger than, or equal to, the number of transmissions of the digital component specified by the input transmission commitment ($N_{inp}$).

In some implementations, the frequency model can include a parametric probability distribution over multiple frequency values, e.g., a shifted Gamma Poisson distribution, or a k-inflated Gamma Poisson (kGP) distribution. As a particular example, the parametric probability distribution can take the form:

$$kGP(n \mid \alpha, \beta, a_1, a_2, \ldots, a_k) = \begin{cases} a_n & \text{if } n \leq k \\ \left(\frac{1 - \sum_{i=1}^{k} a_i}{1 - \sum_{i=1}^{k} GP(i \mid \alpha, \beta)}\right) GP(n \mid \alpha, \beta) & \text{if } n > k \end{cases} \quad (2)$$

where $GP(n|\alpha, \beta, a_1, a_2, \ldots, a_k)$ is a probability mass function with k+2 parameters denoted as $\alpha, \beta, a_1, a_2, \ldots, a_k$, and $GP(\cdot|\alpha, \beta)$ is a Gamma Poisson distribution. In this case, the first k values of the probability mass function can be defined, e.g., arbitrarily, subject to the constraint that they are non-negative and sum to a value that is less than or equal to 1, and the remaining 2 values can be defined by the shifted Gamma Poisson distribution.

As shown in equation (1) and equation (2), the frequency model can be a parametric model that includes the set of parameters that parameterize the probability distribution. The system can generate the frequency model by training the set of model parameters, using a numerical optimization technique, to optimize an objective function that depends on the observed frequency histogram. The numerical optimization technique can be any appropriate numerical optimization technique, e.g., Nelder-Mead numerical optimization technique.

The objective function can measure an error (e.g., using a $\chi^2$ statistic) between: (i) a predicted frequency histogram generated by processing data defining the observed transmission commitment using the frequency model, and (ii) the observed frequency histogram. In some implementations, the error can include one or more of an $L_1$ error, an $L_2$ error, a cross-entropy error, or a cosine-similarity error, and/or any other appropriate error.

As a particular example, the objective function $\mathcal{L}$ can be given by:

$$\mathcal{L} = \sum_{i=1}^{f} \frac{(h_i - \hat{h}_i)^2}{\hat{h}_i} + (sN_{obs} - N_{inv}) \mathbb{I}_{[sN_{obs} > N_{inv}]} \quad (3)$$

where $i \in \{1, \ldots, f\}$ indexes multiple frequency values, $h_i$ is a number of users corresponding to frequency i under the observed frequency histogram, $\hat{h}_i$ is a predicted number of users corresponding to frequency i under the predicted frequency histogram generated by processing data defining the observed transmission commitment using the frequency model, $s > 1$ is a scalar multiple, $N_{obs}$ is the observed number of transmissions of the digital component, $N_{inv}$ is an inventory-level number of transmissions of the digital component, and $\mathbb{I}_{[\cdot]}$ is an indicator function.

As shown in equation (3), in some implementations, the objective function can include an optional penalty term that encourages the inventory-level number of transmissions of the digital component ($N_{inv}$) to exceed a multiple of the observed number of transmissions of the digital component that is specified by the observed transmission commitment ($N_{obs}$). For example, the scalar multiple s in equation (3) can be equal to, or greater than, 2, or any other appropriate numerical value.

Example experimental results of training the set of model parameters of the frequency model to optimize the objective function in equation (3) are illustrated in FIG. 5. Each of the graphs shows the value of the objective function as a function of α and β. As illustrated in FIG. 5, a global minimum of the objective function is positioned in a narrow region, which can be adjacent to a large flat, valley-like area. In some cases, in order to find the global minimum, the system can optimize the objective function in two phases. In the first phase, the system can optimize the objective function so as to find a local minimum of the objective function. After finding the local minimum, the system can optimize the objective function using, e.g., a gradient descent optimization technique, so as to find the global minimum of the objective function.

In the first phase, with reference to equation (2) above, the system can set k=0, fit the parameters of the probability distribution and determine the probability mass function. If the system determines that the resulting value of the objective function in equation (3) is less than the $95^{th}$ percentile of the $\chi^2$ statistic, then the system can determine that the value of the objective function is at, or sufficiently near, the global minimum and can terminate the training process. Otherwise, the system can proceed to the second phase. In the second phase, the system can set k=1, and $a_1$ equal to the probability mass function determined in the previous phase. Then, the system can again determine whether the resulting value of the objective function in equation (3) is less than the $95^{th}$ percentile of the $\chi^2$ statistic, and therefore whether the value of the objective function is at, or sufficiently near, the global minimum. If the value of the objective function is at, or sufficiently near, the global minimum, the system can terminate the process.

The system can repeat this process until it finds a value of the objective function that is sufficiently near the global minimum (e.g., as measured by the $\chi^2$ statistic), or until k=f.

The system receives a request to predict a frequency histogram corresponding to a target transmission commitment (406). For example, a user of the system can provide a request through an API of the system. In some implementations, the request can specify the target transmission commitment of the digital component by means of the publisher.

In response to receiving the request, the system processes data defining the target transmission commitment using the frequency model to generate a predicted frequency histogram corresponding to the target transmission commitment (408). For example, the frequency model can generate the predicted frequency histogram according to equation (1) above.

The system generates one or more predictions characterizing the target transmission commitment using the predicted frequency histogram (410). As described above with reference to FIG. 2, the system can generate a prediction for a number of users that will receive a specified number of transmissions of the digital component under the target transmission commitment. As described above with reference to FIG. 3, the system can generate a prediction for a total number of users that will receive at least one transmission of the digital component under the target transmission commitment (e.g., the reach value).

Example experimental results obtained by the system by means of the single-publisher reach and frequency planning process are described in more detail next with reference to FIG. 6 and FIG. 7.

Figure 6:
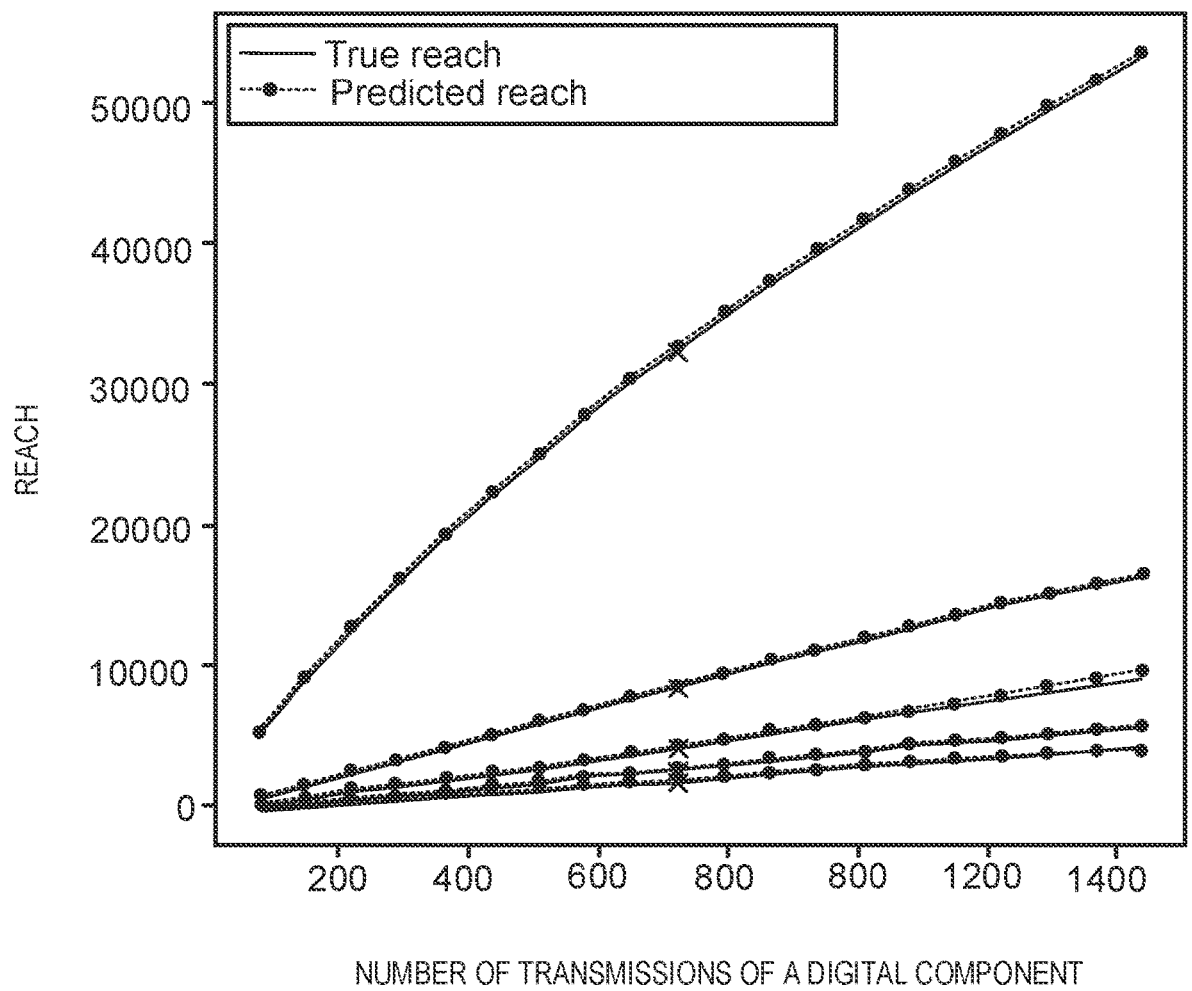
FIG. 6 and FIG. 7 illustrate example single-publisher predictions generated by the reach and frequency planning system.
Figure 7:
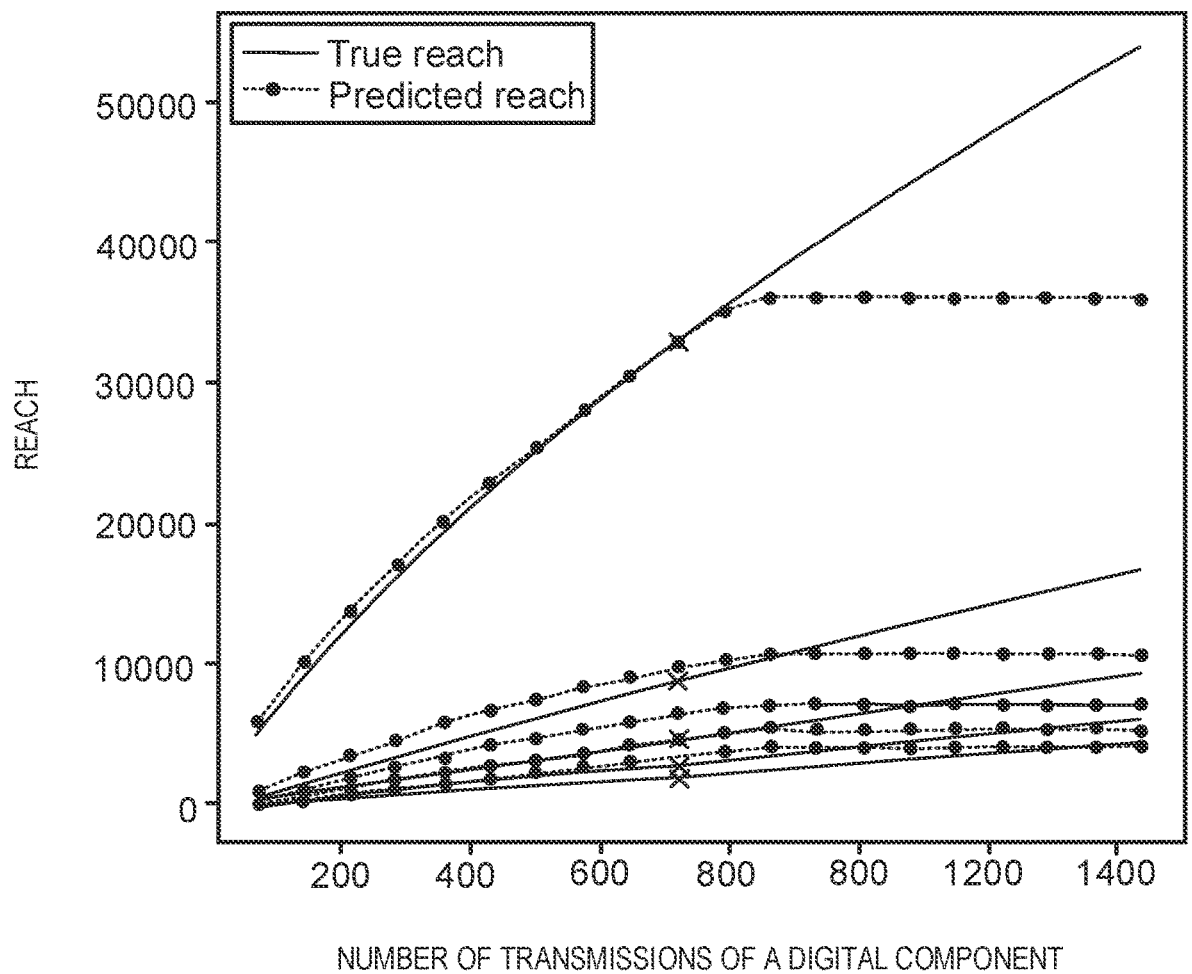

FIG. 6 and FIG. 7 illustrate example single-publisher predictions generated by the reach and frequency planning system (e.g., the system 100 in FIG. 1). The dashed lines in the graphs show predicted reach values (e.g., "Predicted reach") for different transmission commitments, e.g., different numbers of transmission of a digital component. The solid lines show measured reach values (e.g., "True reach") for different transmission commitments. The graphs show experimental results for five different datasets. The x-axis shows the number of transmissions of the digital component×100.

As described above with reference to FIG. 4, the system can use an objective function (e.g., shown by equation (3) above) to train the set of parameters of the frequency model. In some implementations, the objective function can include a penalty term that encourages an inventory-level number of transmissions of the digital component to exceed a multiple of the observed number of transmissions of the digital component that is specified by the observed transmission commitment.

FIG. 6 shows the predictions generated by the system when the objective function includes the penalty term. As shown in FIG. 6, the predicted reach values generated by the system substantially match the measured reach values for all five different datasets. By contrast, FIG. 7 shows that the predictions generated by the system when the objective function does not include the penalty term do not match the measured reach values for a higher number of transmissions of the digital component (e.g., above 800 transmissions of the digital component).

Therefore, by training the set of parameters of the frequency model by using the objective function that includes the penalty term, the system is able to generate more accurate predictions even for a higher number of transmissions of the digital component.

An example process for single- or multi- publisher reach and frequency planning that can be performed by the system is described in more detail next.

Figure 8:
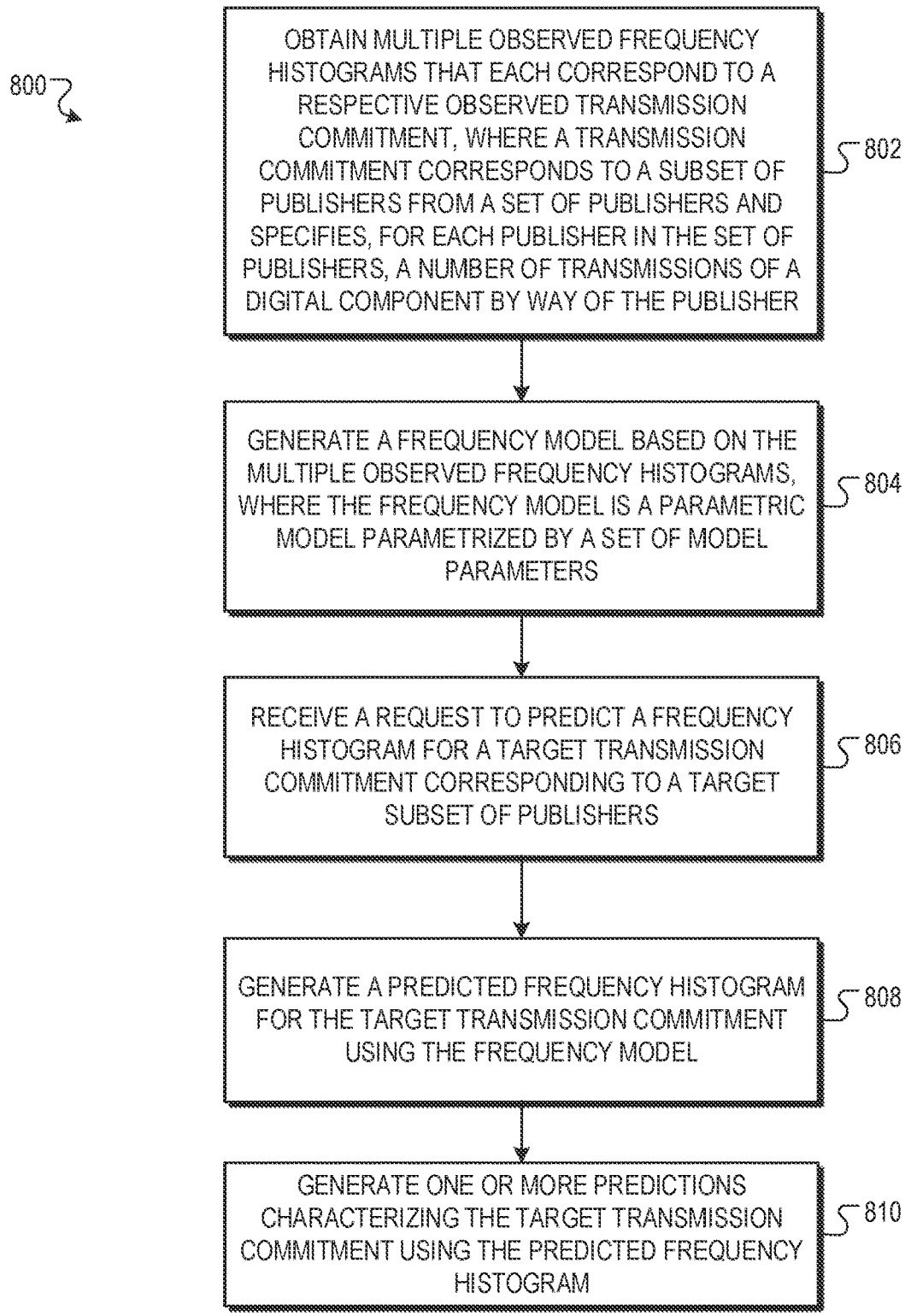
FIG. 8 is a flow diagram of an example process for single- or multi-publisher reach and frequency planning.

FIG. 8 is a flow diagram of another example process 800 for single- or multi-publisher reach and frequency planning. For convenience, the process 800 is described as being performed by a system of one or more computers located in one or more locations. For example, a reach and frequency planning system, e.g., the system 100 of FIG. 1, appropriately programmed in accordance with this specification, can perform the process 800.

The system obtains multiple observed frequency histograms that each correspond to a respective observed transmission commitment (802). The transmission commitment can correspond to a subset of publishers from a set of publishers, e.g., as illustrated below in FIG. 10. In some cases, the subset of publishers can include only a single publisher. In other cases, the subset of publishers can include multiple (e.g., different) publishers. Generally, the set of publishers can include any appropriate number of publishers, e.g., 1 publisher, 10 publishers, 100 publishers, or any other appropriate number of publishers. In some cases, the set of publishers can include different types of publishers.

The transmission commitment can specify, for each publisher in the subset publishers, a number of transmissions of a digital component by way of the publisher. As a particular example, if the subset of publishers includes an application and a social media platform, then the observed transmission commitment can specify 1 million transmissions of the digital component by means of the application, and 2 million transmissions of the digital component by means of the social media platform. In some cases, each transmission commitment can be associated with a different subset of publishers from the set of publishers. In some cases, one or more publishers can be included in the same subset of publishers from the set of publishers.

A frequency histogram corresponding to the transmission commitment can define, for each of multiple frequency values, a respective number of users who received a number of transmissions of the digital component given by the frequency value when the digital component is transmitted in accordance with the transmission commitment, e.g., by means of the subset of publishers in the set of publishers, and the number of times, specified by the transmission commitment. The system can obtain multiple observed frequency histograms, each corresponding to a respective observed transmission commitment, in a similar way as described above with reference to FIG. 1.

The system generates a frequency model based on multiple observed frequency histograms (804). As described above with reference to FIG. 1, the frequency model can be configured to process an input defining an input transmission commitment to generate an output that defines a predicted frequency histogram corresponding to the input transmission commitment. The frequency model can be a parametric model parameterized by a set of model parameters, and can include a parametric probability distribution function over multiple frequency values.

In the case where the system generates the frequency model based on multiple observed frequency histograms, the parametric probability distribution function can be a linear combination of multiple constituent probability distribution functions. Each constituent probability distribution function can define a probability distribution over multiple frequency values, and can have any appropriate form. In one example, each constituent probability distribution function can be a Poisson probability distribution function. The set of model parameters of the frequency model can include, for each constituent probability distribution function: (i) a scaling factor of the constituent parametric probability distribution in the linear combination, and (ii) a set of parameters of the constituent parametric probability distribution.

As a particular example, the frequency model F can be given by:

$$F = C \cdot \Sigma_{j=1}^{J} w_j \cdot P_j(\alpha \cdot \lambda_j) \quad (4)$$

where j indexes the constituent probability distribution functions, J is a number of constituent probability distribution functions, $\alpha$ is a set of parameters derived from the input transmission commitment, $\lambda_j$ defines parameters of the frequency model corresponding to constituent probability distribution function $P_j(\cdot)$, each constituent probability distribution function $P_j(\cdot)$ is parametrized by a $\alpha \cdot \lambda_j$, each $w_j$ is a scaling factor corresponding to constituent probability distribution function $P_j(\cdot)$, and C is a scaling factor derived from the input transmission commitment. In some cases, the scaling factor can be, e.g., the sum of the number of transmissions by means of each publisher as specified by the input transmission commitment.

In equation (4), the set of parameters $\alpha$ derived from the input transmission commitment for each $k \in \{1, \ldots, p\}$ can be given by:

$$\alpha[k] = \frac{N_{inp}[k]}{N_{inv}[k]} \quad (5)$$

where k indexes publishers in the set of publishers, p is a number of publishers in the set of publishers, $\alpha[k]$ is a k-th component of $\alpha$, $N_{inp}[k]$ is a number of transmissions of the digital component by way of publisher k according to the input transmission commitment, and $N_{inv}[k]$ is a hyper-parameter corresponding to publisher k.

Similarly, as described above with reference to FIG. 1, the system can generate the frequency model by training the set of model parameters of the frequency model, using a numerical optimization technique, to optimize an objective function that depends on the observed frequency histograms. In the case where the system generates the frequency model based on multiple observed frequency histograms, the system can optimize the objective function subject to constraints requiring that: (i) each scaling factor is non-negative, and (ii) a sum of the scaling factors results in a default value. The default value can be any appropriate value. As a particular example, the default value can be 1.

For each of multiple observed frequency histograms, the objective function can measure an error between: (i) a predicted frequency histogram generated by processing data defining the observed transmission commitment corresponding to the predicted frequency histogram using the frequency model, and (ii) the observed frequency histogram. The objective function can take any appropriate form. As a particular example, the objective function can measure an $L_1$ error, an $L_2$ error, a cross-entropy error, a cosine-similarity error, and/or any other appropriate error.

The system receives a request to predict a frequency histogram for a target transmission commitment corresponding to a target subset of publishers (806). As described above with reference to FIG. 1, the system can receive the request in any appropriate manner. In one example, the request can be provided by a user of the system. In some implementations, the request can specify the target transmission commitment corresponding to the target subset of publishers.

In response to receiving the request, the system generates a predicted frequency histogram for the target transmission commitment using the frequency model (808). For example, the system can generate the predicted frequency histogram according to equation (4) and equation (5) above.

The system generates one or more predictions characterizing the target transmission commitment using the predicted frequency histogram (810). Similarly, as described above with reference to FIG. 1, the system can generate a prediction for a number of users that will receive a specified number of transmissions of the digital component under the target transmission commitment. In some implementations, the system can generate a prediction for a total number of users that will receive at least one transmission of the digital component under the target transmission commitment.

In this manner, the system can generate one or more predictions characterizing the target transmission commitment that corresponds to a subset of publishers. Another example process for generating predictions characterizing the target transmission commitment that corresponds to a subset of publishers is described in more detail below with reference to FIG. 4.

Figure 9:
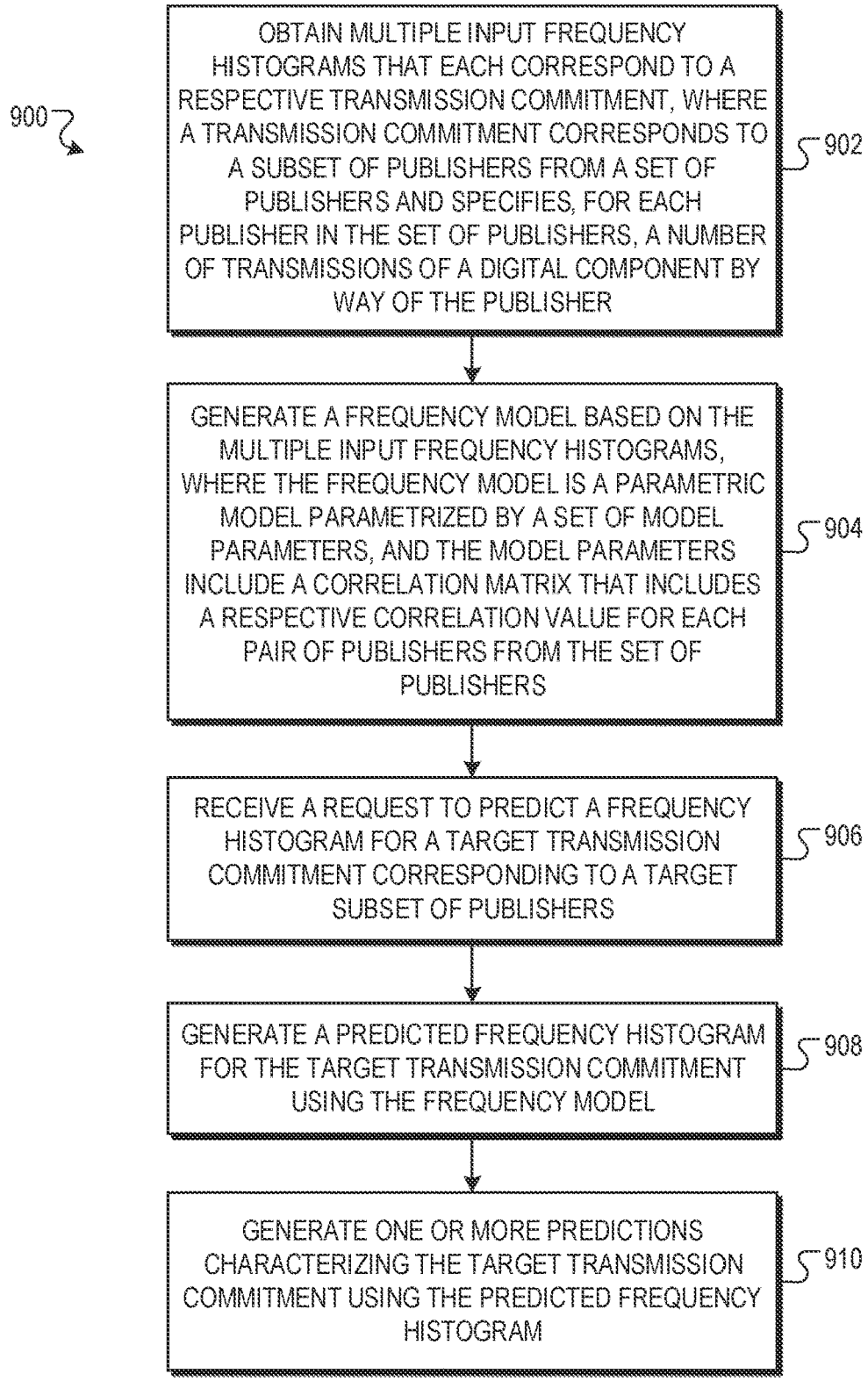
FIG. 9 is a flow diagram of an example process for multi-publisher reach and frequency planning.

FIG. 9 is a flow diagram of another example process 900 for multi-publisher reach and frequency planning. For convenience, the process 900 is described as being performed by a system of one or more computers located in one or more locations. For example, a reach and frequency planning system, e.g., the system 100 of FIG. 1, appropriately programmed in accordance with this specification, can perform the process 900.

The system obtains multiple input frequency histograms that each correspond to a respective transmission commitment (902). As described above with reference to FIG. 8, a transmission commitment can correspond to a subset of publishers from a set of publishers and can specify, for each publisher in the subset publishers, a number of transmissions of a digital component by way of the publisher. A frequency histogram corresponding to the transmission commitment can define, for each of multiple frequency values, a respective number of users who received a number of transmissions of the digital component given by the frequency value when the digital component is transmitted in accordance with the transmission commitment. Different subsets of publishers, and associated frequency histograms, are illustrated in more detail below with reference to FIG. 10.

The system can obtain multiple input frequency histograms by obtaining, for each publisher in the set of publishers, a respective observed frequency histogram corresponding to an observed number of transmissions of the digital component by way of the publisher. Then, the system can generate, for each publisher and based on the observed frequency histogram for the publisher, a respective inventory-level frequency histogram for the publisher that corresponds to an inventory-level number of transmissions of the digital component by way of the publisher. As described above with reference to FIG. 4, the inventory-level number of transmissions of the digital component can be any appropriate number of transmissions of the digital component that is larger than, or equal to, the observed number of transmissions of the digital component. The input frequency histograms can include the respective inventory-level frequency histogram for each publisher.

The system generates a frequency model based on multiple input frequency histograms (904). As described above with reference to FIG. 1, the frequency model can be configured to process an input defining an input transmission commitment to generate an output that defines a predicted frequency histogram corresponding to the input transmission commitment. For multi-publisher reach and frequency planning, the system can generate the predicted frequency histogram using multiple random vectors.

In some implementations, the frequency model can sample multiple random vectors using: (i) a Gaussian copula distribution parameterized by the correlation matrix, and (ii) the input transmission commitment. For example, the frequency model can generate a sample vector from the Gaussian copula distribution parameterized by a correlation matrix, where the sample vector includes a respective dimension corresponding to each publisher. In other words, the frequency model can sample $U_{max}$ from $N(\Sigma)$, where $N(\Sigma)$ is the Gaussian copula distribution and $\Sigma$ is the correlation matrix.

After generating the sample vector, the frequency model can generate a transformed sample vector by transforming each dimension of the sample vector using a frequency histogram for a corresponding publisher. This can include transforming the dimension of the sample vector using a cumulative distribution function of a one-dimensional Gaussian distribution and a cumulative distribution function of the frequency histogram for the corresponding publisher. As a particular example, the frequency model can transform the dimension of the sample vector $U_{max}[i]$ to generate a dimension of the transformed sample vector $V_{max}[i]$ for publisher i as follows:

$$V_{max}[i] = cdf_i^{-1}(\phi(U_{max}[i])) \qquad (6)$$

where $\phi(\cdot)$ is the cumulative distribution function of the one-dimensional standardized Gaussian distribution, and $cdf_i(\cdot)$ is the cumulative distribution function of the frequency histogram for publisher i.

The frequency model can generate each dimension of the random vector based on a corresponding dimension of the transformed sample vector. For example, the frequency model can sample the dimension of the random vector from a binomial distribution parameterized by: (i) a size parameter given by corresponding dimension of the transformed sample vector, e.g., $V_{max}[i]$, and (ii) a probability parameter based on a number of transmissions specified by the input transmission commitment for the corresponding publisher, e.g., $$\frac{E[i]}{E_{max}[i]}$$

where $E[i]$ is the number of transmissions specified by the input transmission commitment for publisher i, and $E_{max}[i]$ is an inventory-level number of transmissions of the digital component for publisher i.

After sampling multiple random vectors as described above, the frequency model can generate the predicted frequency histogram using multiple random vectors. For example, the frequency model can process multiple random vectors to generate a set of scores that includes a respective score for each random vector, where the score for each random vector is defined as, e.g., a sum of components of the random vector. Then, the frequency model can generate the predicted frequency histogram by applying a bin-counting operation to the set of scores (e.g., that counts number of occurrences of each value in the set of scores, e.g., using a numpy.bincount operation from the NumPy package).

The frequency model can be a parametric model parameterized by a set of model parameters, where the model parameters include a correlation matrix (e.g., the correlation matrix) $\Sigma$) that includes a respective correlation value for each pair of publishers from the set of publishers. The system can generate the frequency model by training the set of model parameters of the frequency model, using a numerical optimization technique, to optimize an objective function that depends on the observed frequency histograms.

For one or more of the input frequency histograms, the objective function can measure an error between: (i) a predicted frequency histogram generated by processing data defining the transmission commitment corresponding to the input frequency histogram using the frequency model, and (ii) the input frequency histogram. The error can include one or more of an $L_1$ error, an $L_2$ error, a cross-entropy error, a cosine-similarity error, and/or any other appropriate error. As a particular example, the objective function $\mathcal{L}(\Sigma)$ can have the following form:

$$\mathcal{L}(\Sigma) = \sum_{n=1}^{N} \text{distance}(h_n, g_n) \qquad (7)$$

where n indexes input frequency histograms, distance($\cdot$) can be any appropriate distance (error) function, $h_n$ is the $n^{th}$ observed frequency histogram, and $g_n$ is the predicted frequency histogram.

The system can train the set of model parameters of the frequency model by sequentially training each correlation value in the correlation matrix $\Sigma$. For example, for a pair of publishers (i, j), where i is a first publisher and j is a second publisher, the system can determine a correlation value (e.g., $\Sigma[i, j] = \Sigma[j, i]$) in the correlation matrix that minimizes the objective function shown above by equation (6), while the other elements of the correlation matrix remain fixed. In other words, the system can sequentially implement a univariate optimization of one correlation $\in [-1, 1]$. After training each correlation value in the correlation matrix, the system can use the frequency model to generate predictions characterizing the target transmission commitment.

The system receives a request to predict a frequency histogram for a target transmission commitment corresponding to a target subset of publishers (906). The system can receive the request in a similar way as described above with reference to FIG. 1.

In response to receiving the request, the system generates a predicted frequency histogram for the target transmission commitment using the frequency model (908). For example, the system can use the frequency model to sample random vectors and generate the predicted frequency histogram using the random vectors, as described above.

Then, the system generates one or more predictions characterizing the target transmission commitment using the predicted frequency histogram (910). The system can generate the predictions in a similar way as described above.

An example of multi-publisher frequency planning is illustrated in more detail below with reference to FIG. 10.

Figure 10:
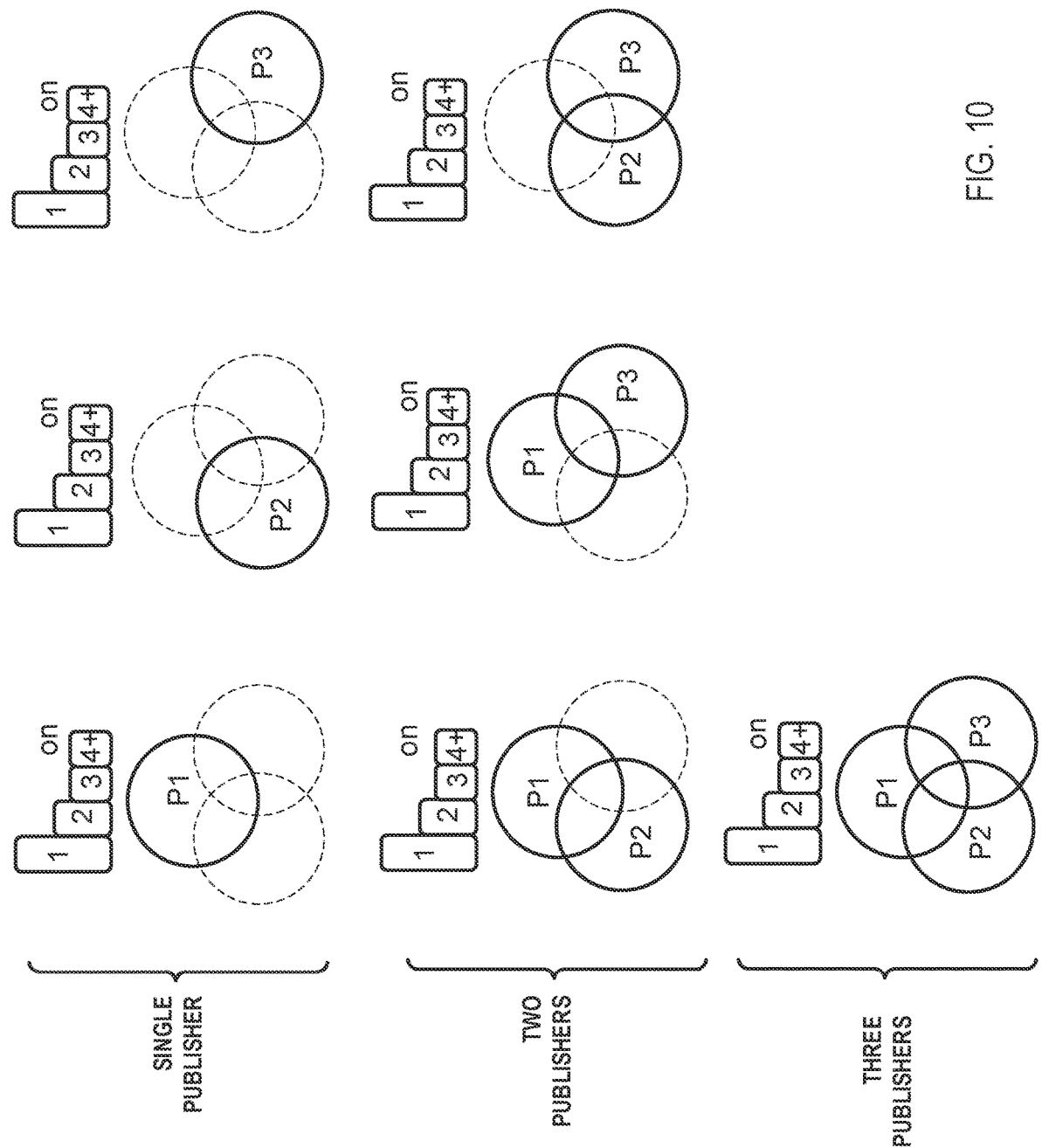
FIG. 10 illustrates an example of multi-publisher reach and frequency planning.

FIG. 10 illustrates an example of multi-publisher reach and frequency planning. In this case, the set of publishers includes three different publishers P1, P2, and P3. The example in FIG. 10 is provided for illustrative purposes only. In general, the set of publishers can include any appropriate number of publishers, e.g., 100 publishers.

As illustrated in FIG. 10, in the three-publisher case, the reach and frequency planning system 100 can generate predictions that characterize a transmission commitment corresponding to any of the seven possible combinations of publishers. For example, in some cases, the transmission commitment can correspond to a subset of publishers that includes only publisher P1. In other cases, the transmission commitment can correspond to a subset of publishers that includes publishers P1, P2, and P3.

FIG. 10 also illustrates predicted frequency histograms for a transmission commitment corresponding to each possible subset of publishers. As described above with reference to FIG. 9, the system can make predictions that characterize a transmission commitment by using the frequency model to generate a predicted frequency histogram. Based on the predicted frequency histogram, the system 100 can generate predictions that characterize any of the seven possible subsets of publishers.

Furthermore, as described above with reference to FIG. 9, the system can train the set of parameters of the frequency model based on multiple observed transmission commitments of a digital component, each transmission commitment corresponding to a subset of publishers. After training, the system can use the frequency model to characterize a hypothetical transmission commitment corresponding to any subset of publishers in the set of publishers, e.g., a subset of publishers that was not used to train the frequency model parameters.

As a particular example, after training the frequency model based on an observed transmission commitment that corresponds to a subset of publishers that includes publisher P1 and publisher P2, the system can use the frequency model to generate predictions that characterize a transmission commitment corresponding to a subset of publishers that includes publisher P1, publisher P2, and publisher P3. In this manner, the system can make predictions characterizing hypothetical transmission commitments that may otherwise only be possible to characterize by making measurements, or observations, directly.

An example environment in which digital components can be transmitted according to a transmission commitment is described in more detail next.

Figure 11:
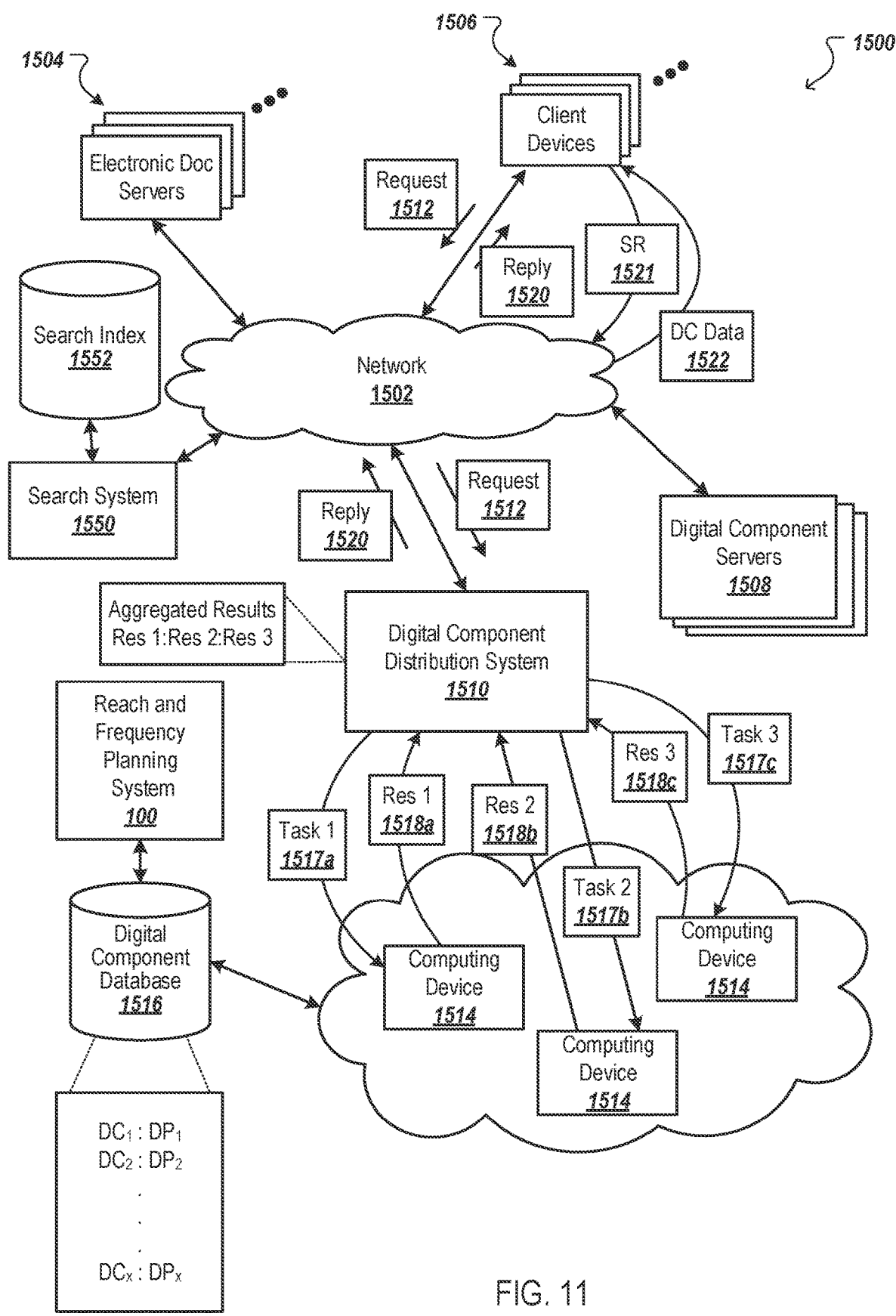
FIG. 11 is a block diagram of an example environment in which a digital component distribution system transmits digital components from a digital component database for presentation with electronic documents.

FIG. 11 is a block diagram of an example environment 1500 in which a digital component distribution system 1510 transmits digital components from a digital component database 1516 for presentation with electronic documents.

The reach and frequency planning system 100 can be used to generate one or more predictions characterizing a target transmission commitment according to which the digital components are transmitted by the digital component distribution system 1510. In some implementations, the digital component distribution system 1510 can transmit digital components according to an observed transmission commitment, and generate an observed frequency histogram associated with the observed transmission commitment. The digital component distribution system 1510 can provide the observed frequency histogram to the reach and frequency planning system 100 that can use it to generate predictions, e.g., as described above.

The example environment 1500 includes a network 1502, such as a local area network (LAN), a wide area network (WAN), the Internet, or a combination thereof. The network 1502 connects electronic document servers 1504, client devices 1506, digital component servers 1508, and a digital component distribution system 1510 (also referred to as a "distribution system" 1510). The example environment 1500 may include many different electronic document servers 1504, client devices 1506, and digital component servers 1508.

A client device 1506 is an electronic device that is capable of requesting and receiving resources over the network 1502. Example client devices 1506 include personal computers, mobile communication devices (e.g., mobile phones), and other devices that can send and receive data over the network 1502. A client device 1506 typically includes a user application, such as a web browser, to facilitate the sending and receiving of data over the network 1502, but native applications executed by the client device 1506 can also facilitate the sending and receiving of data over the network 1502.

An electronic document is data that presents a set of content at a client device 1506. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 1506 by electronic document servers 1504 ("Electronic Doc Servers"). For example, the electronic document servers 1504 can include servers that host publisher websites. In this example, the client device 1506 can initiate a request for a given publisher webpage, and the electronic server 1504 that hosts the given publisher webpage can respond to the request by sending machine executable instructions that initiate presentation of the given webpage at the client device 1506.

In another example, the electronic document servers 1504 can include app servers from which client devices 1506 can download apps. In this example, the client device 1506 can download files required to install an app at the client device 1506, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 1506 to request content from the data source when the given electronic document is processed (e.g., rendered or executed) by a client device 1506. The client device 1506 integrates the content obtained from the data source into the given electronic document to create a composite electronic document including the content obtained from the data source.

In some situations, a given electronic document can include one or more digital component tags or digital component scripts that reference the digital component distribution system 1510. In these situations, the digital component tags or digital component scripts are executed by the client device 1506 when the given electronic document is processed by the client device 1506. Execution of the digital component tags or digital component scripts configures the client device 1506 to generate a request for one or more digital components 1512 (referred to as a "component request"), which is transmitted over the network 1502 to the digital component distribution system 1510. For example, a digital component tag or digital component script can enable the client device 1506 to generate a packetized data request including a header and payload data. The component request 1512 can include event data specifying features such as a name (or network location) of a server from which the digital component is being requested, a name (or network location) of the requesting device (e.g., the client device 1506), and/or information that the digital component distribution system 1510 can use to select one or more digital components provided in response to the request. The component request 1512 is transmitted, by the client device 1506, over the network 1502 (e.g., a telecommunications network) to a server of the digital component distribution system 1510.

The component request 1512 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 1510. Similarly, event data specifying keywords associated with the electronic document ("document keywords") or entities (e.g., people, places, or things) that are referenced by the electronic document can also be included in the component request 1512 (e.g., as payload data) and provided to the digital component distribution system 1510 to facilitate identification of digital components that are eligible for presentation with the electronic document. The event data can also include a search query that was submitted from the client device 1506 to obtain a search results page, and/or data specifying search results and/or textual, audible, or other visual content that is included in the search results.

Component requests 1512 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 1512 can be transmitted, for example, over a packetized network, and the component requests 1512 themselves can be formatted as packetized data having a header and payload data. The header can specify a destination of the packet and the payload data can include any of the information discussed above.

The component distribution system 1510 chooses digital components that will be presented with the given electronic document in response to receiving the component request 1512 and/or using information included in the component request 1512. In some implementations, a digital component is selected (using the techniques described herein) in less than a second to avoid errors that could be caused by delayed selection of the digital component. For example, delays in providing digital components in response to a component request 1512 can result in page load errors at the client device 1506 or cause portions of the electronic document to remain unpopulated even after other portions of the electronic document are presented at the client device 1506. Also, as the delay in providing the digital component to the client device 1506 increases, it is more likely that the electronic document will no longer be presented at the client device 1506 when the digital component is delivered to the client device 1506, thereby negatively impacting a user's experience with the electronic document. Further, delays in providing the digital component can result in a failed delivery of the digital component, for example, if the electronic document is no longer presented at the client device 1506 when the digital component is provided.

In some implementations, the digital component distribution system 1510 is implemented in a distributed computing system that includes, for example, a server and a set of multiple computing devices 1514 that are interconnected and identify and distribute digital components in response to requests 1512. The set of multiple computing devices 1514 operate together to identify a set of digital components that are eligible to be presented in the electronic document from a corpus of millions of available digital components (DC1-x). The millions of available digital components can be indexed, for example, in a digital component database 1516. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 1512) in order for the digital component to be eligible for presentation. In other words, the distribution parameters are used to trigger distribution (e.g., transmission) of the digital components over the network 1502. The distribution parameters can also require that the component request 1512 include information specifying a particular geographic region (e.g., country or state) and/or information specifying that the component request 1512 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks 1517a-1517c that are then assigned among computing devices within the set of multiple computing devices 1514. For example, different computing devices in the set 1514 can each analyze a different portion of the digital component database 1516 to identify various digital components having distribution parameters that match information included in the component request 1512. In some implementations, each given computing device in the set 1514 can analyze a different data dimension (or set of dimensions) and pass (e.g., transmit) results (Res1-Res3) 1518a-1518c of the analysis back to the digital component distribution system 1510. For example, the results 1518a-1518c provided by each of the computing devices in the set 1514 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 1510 aggregates the results 1518a-1518c received from the set of multiple computing devices 1514 and uses information associated with the aggregated results to: (i) select one or more digital components that will be provided in response to the request 1512, and (ii) determine transmission requirements for the one or more digital components. For example, the digital component distribution system 1510 can select a set of winning digital components (one or more digital components) based on the outcome of one or more component evaluation processes. In turn, the digital component distribution system 1510 can generate and transmit, over the network 1502, reply data 1520 (e.g., digital data representing a reply) that enables the client device 1506 to integrate the set of winning digital components into the given electronic document, such that the set of winning digital components and the content of the electronic document are presented together at a display of the client device 1506.

In some implementations, the client device 1506 executes instructions included in the reply data 1520, which configures and enables the client device 1506 to obtain the set of winning digital components from one or more digital component servers. For example, the instructions in the reply data 1520 can include a network location (e.g., a Uniform Resource Locator (URL)) and a script that causes the client device 1506 to transmit a server request (SR) 1521 to the digital component server 1508 to obtain a given winning digital component from the digital component server 1508. In response to the request, the digital component server 1508 will identify the given winning digital component specified in the server request 1521 (e.g., within a database storing multiple digital components) and transmit, to the client device 1506, digital component data (DC Data) 1522 that presents the given winning digital component in the electronic document at the client device 1506.

To facilitate searching of electronic documents, the environment 1500 can include a search system 1550 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 1552 (e.g., hardware memory device(s)). Data that are associated with an electronic document is data that represents content included in the electronic document and/or metadata for the electronic document.

Client devices 1506 can submit search queries to the search system 1550 over the network 1502. In response, the search system 1550 accesses the search index 1552 to identify electronic documents that are relevant to the search query. The search system 1550 identifies the electronic documents in the form of search results and returns the search results to the client device 1506 in a search results page. A search result is data generated by the search system 1550 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 1506. In some situations, the search system 1550 can be part of, or interact with, an application store (or an online portal) from which applications can be downloaded for install at a client device 1506 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 1510 may identify a set of digital components that are eligible to be transmitted in response to the component request. The distribution system 1510 may then select one or more of the eligible digital components to be transmitted through, e.g., an auction procedure. In some implementations, the distribution system 1510 performs an auction procedure by ranking the eligible digital components in accordance with their respective eligibility values, and selecting one or more highest-ranked digital components to be transmitted in response to the component request.

For example, the distribution system 1510 may identify digital components A, B, and C as eligible to be transmitted in response to a component request. In this example, digital component A has an eligibility value of $5, digital component B has an eligibility value of $1, and digital component C has an eligibility value of $5.5, where the eligibility values of the digital components represent bids associated with the digital components. The distribution system 1510 may rank (e.g., in descending order) the digital components in accordance with their respective eligibility values as: C, A, B.

Finally, the distribution system 1510 may select the highest ranked digital component C for transmission in response to the component request After selecting a digital component to be transmitted in response to a digital component request, the distribution system 1510 determines a transmission requirement for the selected digital component. A transmission requirement specifies an action to be performed by the provider of a digital component in response to a transmission of the digital component. For example, the transmission requirement may specify that the provider of the digital component submit an amount of compensation in response to the transmission of the digital component. In some cases, the amount of compensation specifies an amount to be submitted for each instance of specific events attributed to the presentation of the digital component (e.g., user interactions with the digital component).

The distribution system 1510 may determine the transmission requirement of the selected digital component based on the eligibility value of the selected digital component and/or the eligibility values of the other digital components that were determined as eligible to be transmitted in response to the component request. For example, the distribution system 1510 may identify digital components A, B, and C as eligible for transmission in response to a digital component request, where A, B, and C have respective eligibility values of $5, $1, and $5.5. The distribution system 1510 may select digital component C for transmission (since it has the highest eligibility value), and may determine the transmission requirement for digital component C to be the next highest eligibility value from amongst the eligibility values of the eligible digital components. In this example, next highest eligibility value is $5 (i.e., the eligibility value of digital component A), and therefore the distribution system 1510 may determine the transmission requirement of digital component C to be $5.

Figure 12:
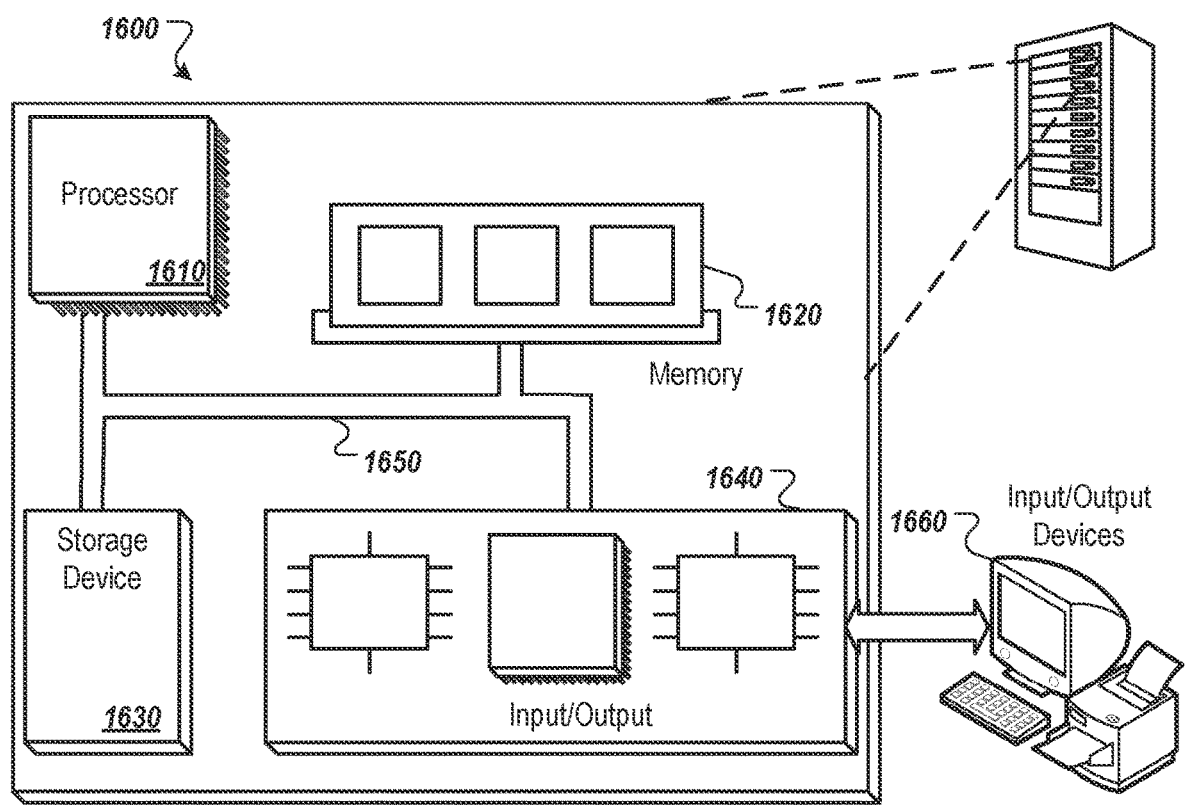
FIG. 12 is a block diagram of an example computer system.

FIG. 12 is a block diagram of an example computer system 1600 that can be used to perform operations described above. The system 1600 includes a processor 1610, a memory 1620, a storage device 1630, and an input/output device 1640. Each of the components 1610, 1620, 1630, and 1640 can be interconnected, for example, using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 can include, for example, a hard disk device, an optical disk device, a storage device that is shared over a network by multiple computing devices (e.g., a cloud storage device), or some other large capacity storage device.

The input/output device 1640 provides input/output operations for the system 1600. In one implementation, the input/output device 1640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1660. Other implementations, however, can also be used, such as mobile computing devices, mobile communication devices, set-top box television client devices, etc.

Although an example processing system has been described in FIG. 12, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a plurality of input frequency histograms that each correspond to a respective transmission commitment, wherein:
        a transmission commitment corresponds to a subset of publishers from a set of publishers and specifies, for each publisher in the subset publishers, a number of transmissions of a digital component by way of the publisher, and
        a frequency histogram corresponding to the transmission commitment defines, for each of a plurality of frequency values, a respective number of users who received a number of transmissions of the digital component given by the frequency value when the digital component is transmitted in accordance with the transmission commitment;
    generating a frequency model based on the plurality of input frequency histograms, wherein:
        the frequency model is a parametric model parameterized by a set of model parameters, wherein the model parameters comprise a correlation matrix that includes a respective correlation value for each pair of publishers from the set of publishers;
        the frequency model is configured to process an input defining an input transmission commitment to generate an output that defines a predicted frequency histogram corresponding to the input transmission commitment, comprising:
            sampling a plurality of random vectors using: (i) a Gaussian copula distribution parameterized by the correlation matrix, and (ii) the input transmission commitment; and
            generating the predicted frequency histogram using the plurality of random vectors, comprising:
                processing the plurality of random vectors to generate a set of scores that includes a respective score for each random vector; and
                generating the predicted frequency histogram by applying a bin-counting operation to the set of scores; and
        generating the frequency model comprises training the set of model parameters of the frequency model,
            using a numerical optimization technique, to optimize an objective function that depends on the input frequency histograms;
    receiving a request to predict a frequency histogram for a target transmission commitment corresponding to a target subset of publishers; and
    in response to receiving the request:
        generating a predicted frequency histogram for the target transmission commitment using the frequency model; and
        generating one or more predictions characterizing the target transmission commitment using the predicted frequency histogram;
    determining, based at least in part on the predictions characterizing the target transmission commitment, a predicted number of transmissions of the digital component required to achieve a target reach for transmissions of the digital component; and
    transmitting the digital component from a server to a plurality of remotely located user devices over a data communications network, comprising:
        limiting transmission of the digital component based on the predicted number of transmissions of the digital component to reduce a likelihood of exceeding the target reach for transmissions of the digital component;
    wherein for one or more of the remotely located user devices, a transmission of the digital component from the server to the remotely located user device is triggered by the remotely located user device performing operations comprising:
        executing a digital component tag or digital component script included in an electronic document to generate a packetized data request for the digital component to be transmitted to the remotely located user device for presentation in the electronic document, wherein the packetized data request a name or network location of a server from which the digital component is being requested.

2. The method of claim 1, wherein sampling a random vector using: (i) the Gaussian copula distribution parameterized by the correlation matrix, and (ii) the input transmission commitment, comprises:
    generating a sample vector from the Gaussian copula distribution parameterized by the correlation matrix, wherein the sample vector comprises a respective dimension corresponding to each publisher;
    generating a transformed sample vector by transforming each dimension of the sample vector using a frequency histogram for a corresponding publisher; and
    generating each dimension of the random vector based on a corresponding dimension of the transformed sample vector.

3. The method of claim 2, wherein generating the transformed sample vector by transforming each dimension of the sample vector using the frequency histogram for the corresponding publisher comprises, for each dimension of the sample vector:
    transforming the dimension of the sample vector using a cumulative distribution function of a one-dimensional Gaussian distribution and a cumulative distribution function of the frequency histogram for the corresponding publisher.

4. The method of claim 2, wherein generating each dimension of the random vector based on the corresponding dimension of the transformed sample vector comprises:

sampling the dimension of the random vector from a binomial distribution parameterized by: (i) a size parameter given by corresponding dimension of the transformed sample vector, and (ii) a probability parameter based on a number of transmissions specified by the input transmission commitment for the corresponding publisher.

5. The method of claim 1, wherein the score for each random vector is defined as a sum of components of the random vector.

6. The method of claim 1, wherein obtaining the plurality of input frequency histograms comprises:
obtaining, for each publisher in the set of publishers, a respective observed frequency histogram corresponding to an observed number of transmissions of the digital component by way of the publisher; and
generating, for each publisher and based on the observed frequency histogram for the publisher, a respective inventory-level frequency histogram for the publisher that corresponds to an inventory-level number of transmissions of the digital component by way of the publisher,
wherein the plurality of input frequency histograms include the respective inventory-level frequency histogram for each publisher.

7. The method of claim 1, wherein for one or more of the input frequency histograms, the objective function measures an error between: (i) a predicted frequency histogram generated by processing data defining the transmission commitment corresponding to the input frequency histogram using the frequency model, and (ii) the input frequency histogram.

8. The method of claim 7, wherein the error comprises one or more of an $L_1$ error, an $L_2$ error, a cosine-similarity error, or a cross-entropy error.

9. The method of claim 1, wherein training the set of model parameters of the frequency model comprises sequentially training each correlation value in the correlation matrix.

10. The method of claim 1, wherein generating one or more predictions characterizing the target transmission commitment using the predicted frequency histogram comprises:
generating a prediction for a number of users that will receive a specified number of transmissions of the digital component under the target transmission commitment.

11. The method of claim 1, wherein generating one or more predictions characterizing the target transmission commitment using the predicted frequency histogram comprises:
generating a prediction for a total number of users that will receive at least one transmission of the digital component under the target transmission commitment.

12. A system comprising:
one or more computers; and
one or more storage devices communicatively coupled to the one or more computers, wherein the one or more storage devices store instructions that, when executed by the one or more computers, cause the one or more computers to perform operations comprising:
obtaining a plurality of input frequency histograms that each correspond to a respective transmission commitment, wherein:
a transmission commitment corresponds to a subset of publishers from a set of publishers and specifies, for each publisher in the subset publishers, a number of transmissions of a digital component by way of the publisher, and
a frequency histogram corresponding to the transmission commitment defines, for each of a plurality of frequency values, a respective number of users who received a number of transmissions of the digital component given by the frequency value when the digital component is transmitted in accordance with the transmission commitment;
generating a frequency model based on the plurality of input frequency histograms, wherein:
the frequency model is a parametric model parameterized by a set of model parameters, wherein the model parameters comprise a correlation matrix that includes a respective correlation value for each pair of publishers from the set of publishers;
the frequency model is configured to process an input defining an input transmission commitment to generate an output that defines a predicted frequency histogram corresponding to the input transmission commitment, comprising:
sampling a plurality of random vectors using: (i) a Gaussian copula distribution parameterized by the correlation matrix, and (ii) the input transmission commitment; and
generating the predicted frequency histogram using the plurality of random vectors, comprising:
processing the plurality of random vectors to generate a set of scores that includes a respective score for each random vector; and
generating the predicted frequency histogram by applying a bin-counting operation to the set of scores; and
generating the frequency model comprises training the set of model parameters of the frequency model, using a numerical optimization technique, to optimize an objective function that depends on the input frequency histograms;
receiving a request to predict a frequency histogram for a target transmission commitment corresponding to a target subset of publishers; and
in response to receiving the request:
generating a predicted frequency histogram for the target transmission commitment using the frequency model; and
generating one or more predictions characterizing the target transmission commitment using the predicted frequency histogram;
determining, based at least in part on the predictions characterizing the target transmission commitment, a predicted number of transmissions of the digital component required to achieve a target reach for transmissions of the digital component; and
transmitting the digital component from a server to a plurality of remotely located user devices over a data communications network, comprising:
limiting transmission of the digital component based on the predicted number of transmissions of the digital component to reduce a likelihood of exceeding the target reach for transmissions of the digital component;
wherein for one or more of the remotely located user devices, a transmission of the digital component from the server to the remotely located user device is triggered by the remotely located user device performing operations comprising:
executing a digital component tag or digital component script included in an electronic document to generate a packetized data request for the digital component to be transmitted to the remotely located user device for presentation in the electronic document, wherein the packetized data request a name or network location of a server from which the digital component is being requested.

13. One or more non-transitory computer storage media storing instructions that when executed by one or more computers cause the one or more computers to perform operations comprising:
obtaining a plurality of input frequency histograms that each correspond to a respective transmission commitment, wherein:
a transmission commitment corresponds to a subset of publishers from a set of publishers and specifies, for each publisher in the subset publishers, a number of transmissions of a digital component by way of the publisher, and
a frequency histogram corresponding to the transmission commitment defines, for each of a plurality of frequency values, a respective number of users who received a number of transmissions of the digital component given by the frequency value when the digital component is transmitted in accordance with the transmission commitment;
generating a frequency model based on the plurality of input frequency histograms, wherein:
the frequency model is a parametric model parameterized by a set of model parameters, wherein the model parameters comprise a correlation matrix that includes a respective correlation value for each pair of publishers from the set of publishers;
the frequency model is configured to process an input defining an input transmission commitment to generate an output that defines a predicted frequency histogram corresponding to the input transmission commitment, comprising:
sampling a plurality of random vectors using: (i) a Gaussian copula distribution parameterized by the correlation matrix, and (ii) the input transmission commitment; and
generating the predicted frequency histogram using the plurality of random vectors, comprising:
processing the plurality of random vectors to generate a set of scores that includes a respective score for each random vector; and
generating the predicted frequency histogram by applying a bin-counting operation to the set of scores; and
generating the frequency model comprises training the set of model parameters of the frequency model, using a numerical optimization technique, to optimize an objective function that depends on the input frequency histograms;
receiving a request to predict a frequency histogram for a target transmission commitment corresponding to a target subset of publishers; and
in response to receiving the request:
generating a predicted frequency histogram for the target transmission commitment using the frequency model; and
generating one or more predictions characterizing the target transmission commitment using the predicted frequency histogram;
determining, based at least in part on the predictions characterizing the target transmission commitment, a predicted number of transmissions of the digital component required to achieve a target reach for transmissions of the digital component; and
transmitting the digital component from a server to a plurality of remotely located user devices over a data communications network, comprising:
limiting transmission of the digital component based on the predicted number of transmissions of the digital component to reduce a likelihood of exceeding the target reach for transmissions of the digital component;
wherein for one or more of the remotely located user devices, a transmission of the digital component from the server to the remotely located user device is triggered by the remotely located user device performing operations comprising:
executing a digital component tag or digital component script included in an electronic document to generate a packetized data request for the digital component to be transmitted to the remotely located user device for presentation in the electronic document, wherein the packetized data request a name or network location of a server from which the digital component is being requested.

14. The one or more non-transitory computer storage media of claim 13, wherein sampling a random vector using: (i) the Gaussian copula distribution parameterized by the correlation matrix, and (ii) the input transmission commitment, comprises:
generating a sample vector from the Gaussian copula distribution parameterized by the correlation matrix, wherein the sample vector comprises a respective dimension corresponding to each publisher;
generating a transformed sample vector by transforming each dimension of the sample vector using a frequency histogram for a corresponding publisher; and
generating each dimension of the random vector based on a corresponding dimension of the transformed sample vector.

15. The one or more non-transitory computer storage media of claim 14, wherein generating the transformed sample vector by transforming each dimension of the sample vector using the frequency histogram for the corresponding publisher comprises, for each dimension of the sample vector:
transforming the dimension of the sample vector using a cumulative distribution function of a one-dimensional Gaussian distribution and a cumulative distribution function of the frequency histogram for the corresponding publisher.

16. The one or more non-transitory computer storage media of claim 14, wherein generating each dimension of the random vector based on the corresponding dimension of the transformed sample vector comprises:
sampling the dimension of the random vector from a binomial distribution parameterized by: (i) a size parameter given by the corresponding dimension of the transformed sample vector, and (ii) a probability parameter based on a number of transmissions specified by the input transmission commitment for the corresponding publisher.

17. The one or more non-transitory computer storage media of claim 13, wherein the score for each random vector is defined as a sum of components of the random vector.

18. The one or more non-transitory computer storage media of claim 13, wherein obtaining the plurality of input frequency histograms comprises:

obtaining, for each publisher in the set of publishers, a respective observed frequency histogram corresponding to an observed number of transmissions of the digital component by way of the publisher; and generating, for each publisher and based on the observed frequency histogram for the publisher, a respective inventory-level frequency histogram for the publisher that corresponds to an inventory-level number of transmissions of the digital component by way of the publisher, wherein the plurality of input frequency histograms include the respective inventory-level frequency histogram for each publisher.

19. The one or more non-transitory computer storage media of claim 13, wherein for one or more of the input frequency histograms, the objective function measures an error between: (i) a predicted frequency histogram generated by processing data defining the transmission commitment corresponding to the input frequency histogram using the frequency model, and (ii) the input frequency histogram.

20. The one or more non-transitory computer storage media of claim 19, wherein the error comprises one or more of an $L_1$ error, an $L_2$ error, a cosine-similarity error, or a cross-entropy error.

* * * * *

UNITED STATES PATENT AND TRADEMARK OFFICE
CERTIFICATE OF CORRECTION

| | |
|---|---|
| PATENT NO. | : 12,346,873 B2 |
| APPLICATION NO. | : 17/845778 |
| DATED | : July 1, 2025 |
| INVENTOR(S) | : Peng et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 314 days.

Signed and Sealed this
Sixteenth Day of December, 2025

John A. Squires
*Director of the United States Patent and Trademark Office*